United States Patent [19]
Chaum et al.

[11] Patent Number: 5,485,520
[45] Date of Patent: Jan. 16, 1996

[54] AUTOMATIC REAL-TIME HIGHWAY TOLL COLLECTION FROM MOVING VEHICLES

[75] Inventors: David Chaum, Sherman Oaks, Calif.; Peter L. Hendrick, Jupiter, Fla.

[73] Assignee: Amtech Corporation, Dallas, Tex.

[21] Appl. No.: 132,984

[22] Filed: Oct. 7, 1993

[51] Int. Cl.[6] .................................................. H04L 9/00
[52] U.S. Cl. .................. 380/24; 380/23; 340/825.31; 340/825.34; 235/379; 235/380; 235/384; 342/42; 342/44; 342/50; 342/51
[58] Field of Search .................. 380/23, 24; 342/42–45, 342/50, 51; 235/379, 380, 384; 340/825.31, 825.34

[56] References Cited

U.S. PATENT DOCUMENTS

| | | | |
|---|---|---|---|
| 4,075,632 | 2/1978 | Baldwin et al. | 342/51 |
| 4,303,904 | 12/1981 | Chasek | 235/384 |
| 4,739,328 | 4/1988 | Koelle et al. | 342/44 |
| 4,759,063 | 7/1988 | Chaum | 380/30 |
| 4,926,480 | 5/1990 | Chaum | 380/23 |
| 5,030,807 | 7/1991 | Landt et al. | 235/375 |
| 5,055,659 | 10/1991 | Hendrick et al. | 235/439 |
| 5,086,389 | 2/1992 | Hassett et al. | 364/401 |
| 5,131,039 | 7/1992 | Chaum | 380/23 |
| 5,144,553 | 9/1992 | Hassett et al. | 364/401 |
| 5,310,999 | 5/1994 | Claus et al. | 235/384 |

*Primary Examiner*—Bernarr E. Gregory
*Attorney, Agent, or Firm*—Nixon & Vanderhye

[57] ABSTRACT

One or more roadside collection stations (RCS) communicate over a short-range, high speed bidirectional microwave communication link with one or more in-vehicle units (IVU) associated with one or more respectively corresponding vehicles in one or more traffic lanes of a highway. At least two up-link (IVU to RCS) communication sessions and at least one downlink (RCS to IVU) communication session are transacted in real time during the limited duration of an RCS communication footprint as the vehicle travels along its lane past a highway toll plaza. Especially efficient data formatting and processing is utilized so as to permit, during this brief interval, computation of the requisite toll amount and a fully verified and cryptographically secured (preferably anonymous) debiting of a smart card containing electronic money. Preferably an untraceable electronic check is communicated in a cryptographically sealed envelope with opener. Transaction linkage data is utilized in each phase of the complete toll payment transaction to facilitate simultaneous multi-lane RCS/IVU operation. A plaza computer local area network and downlink plaza controller is also used to facilitate simultaneous multi-lane transactions.

46 Claims, 15 Drawing Sheets

FIG. 2A
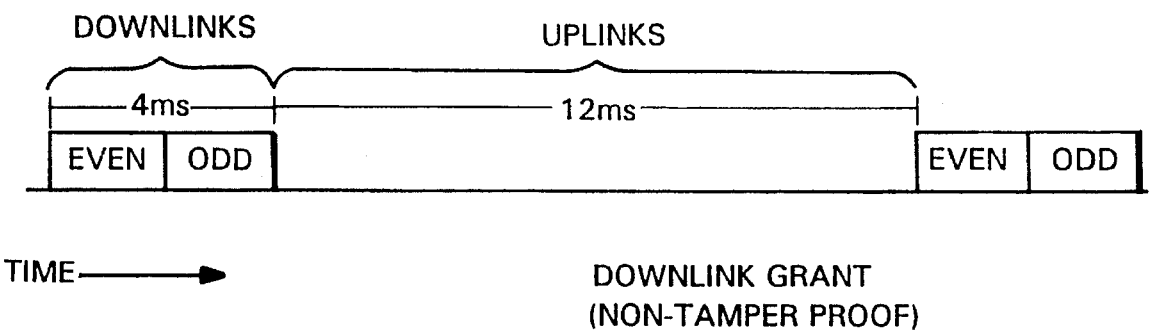
DOWNLINK GRANT
(NON-TAMPER PROOF)
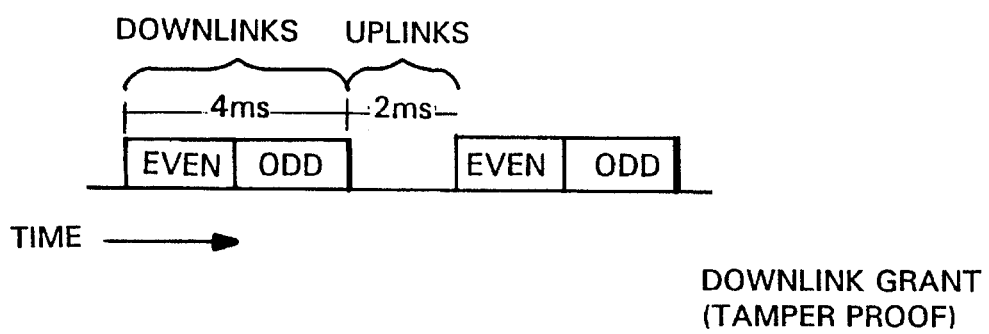
DOWNLINK GRANT
(TAMPER PROOF)
FIG. 2B

DOWNLINK CONTROL

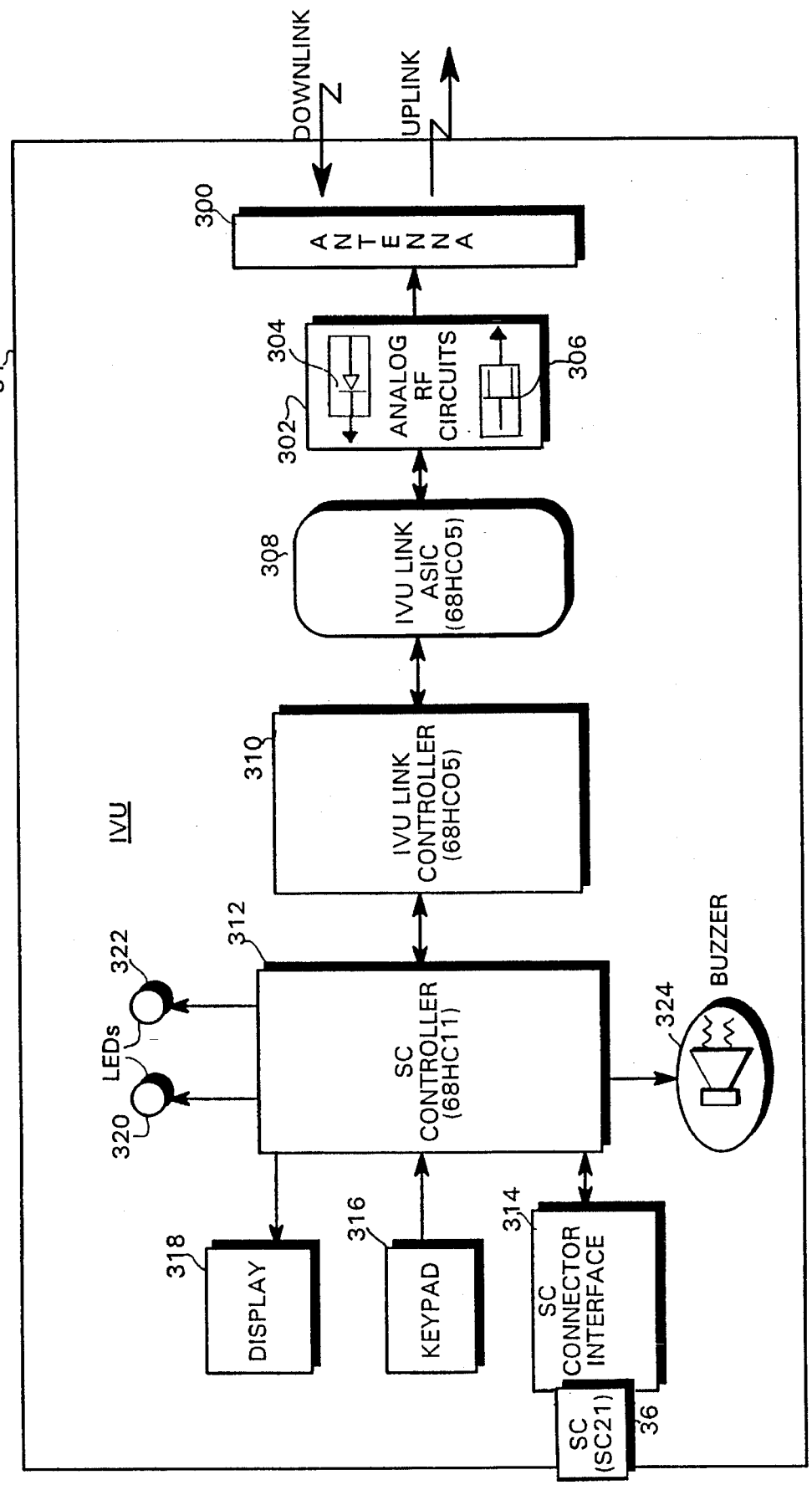

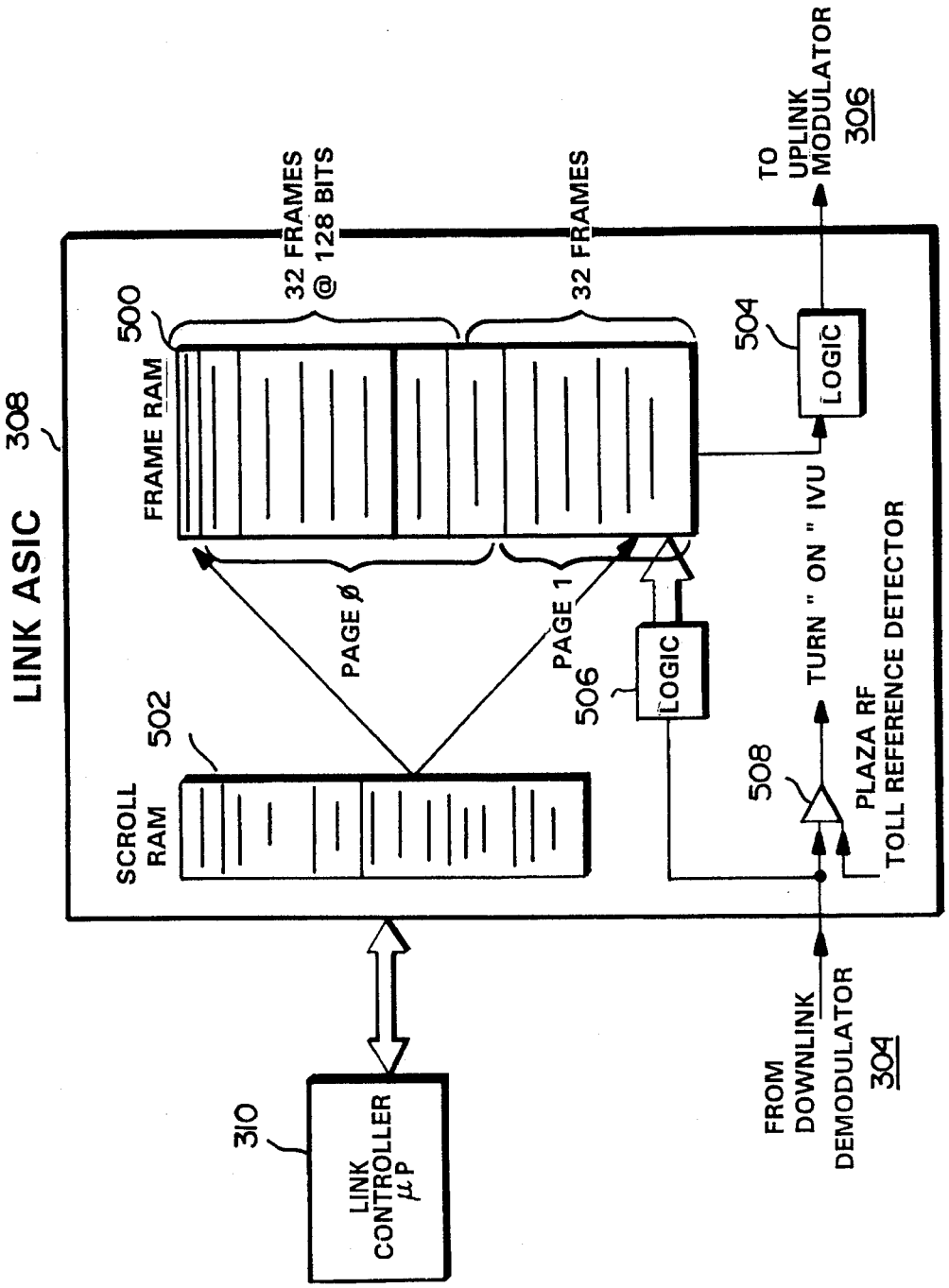

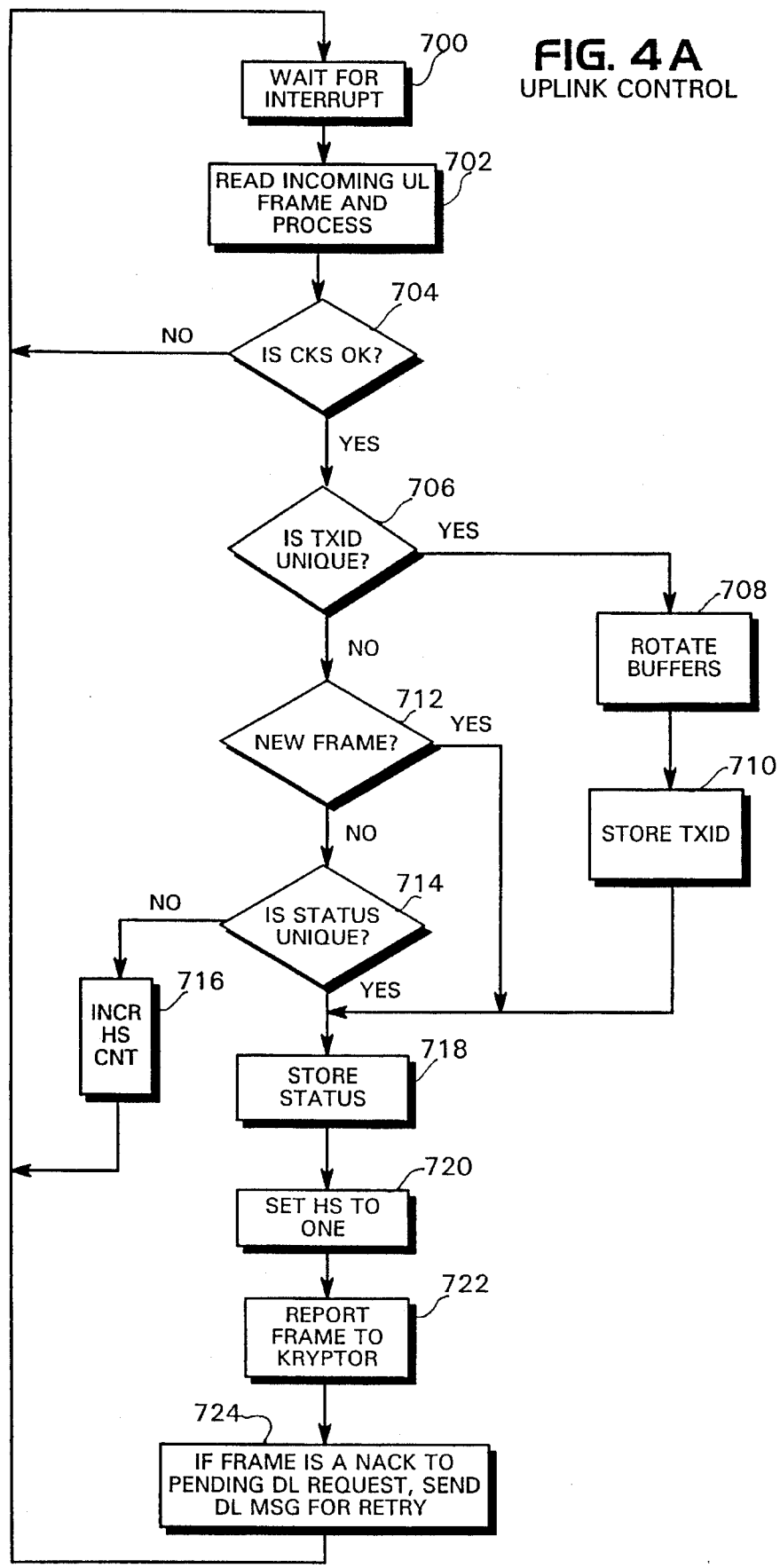

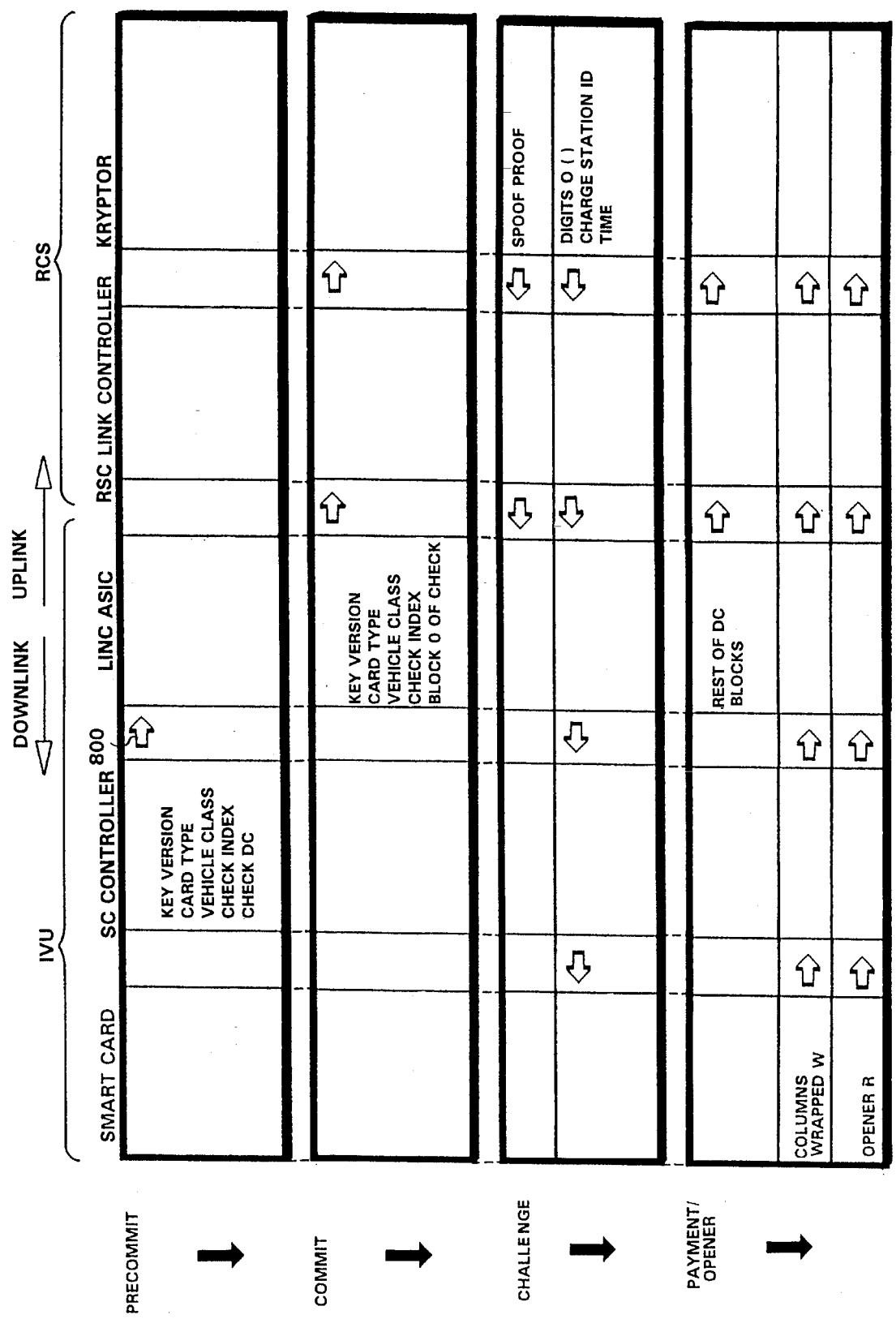

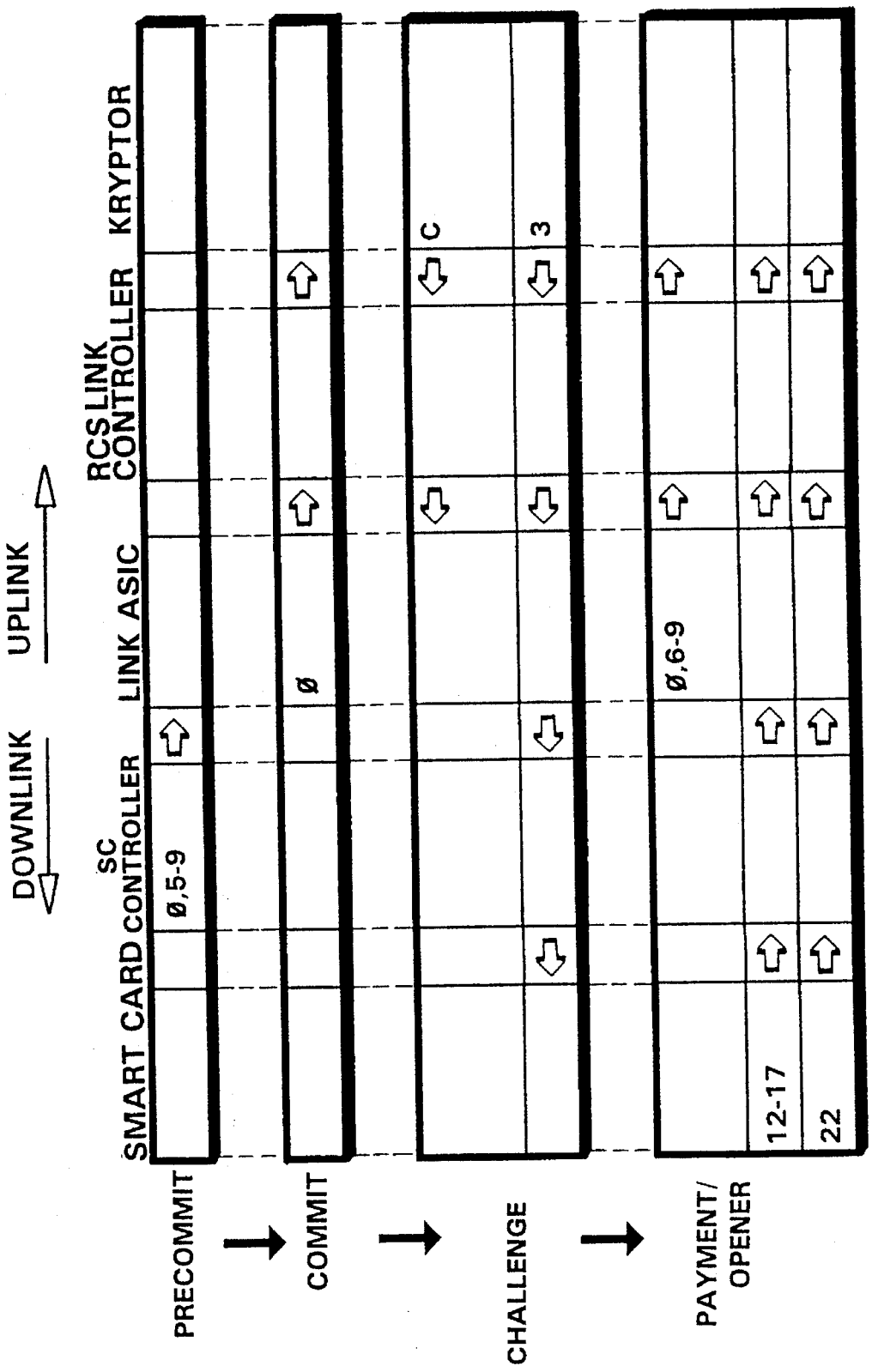

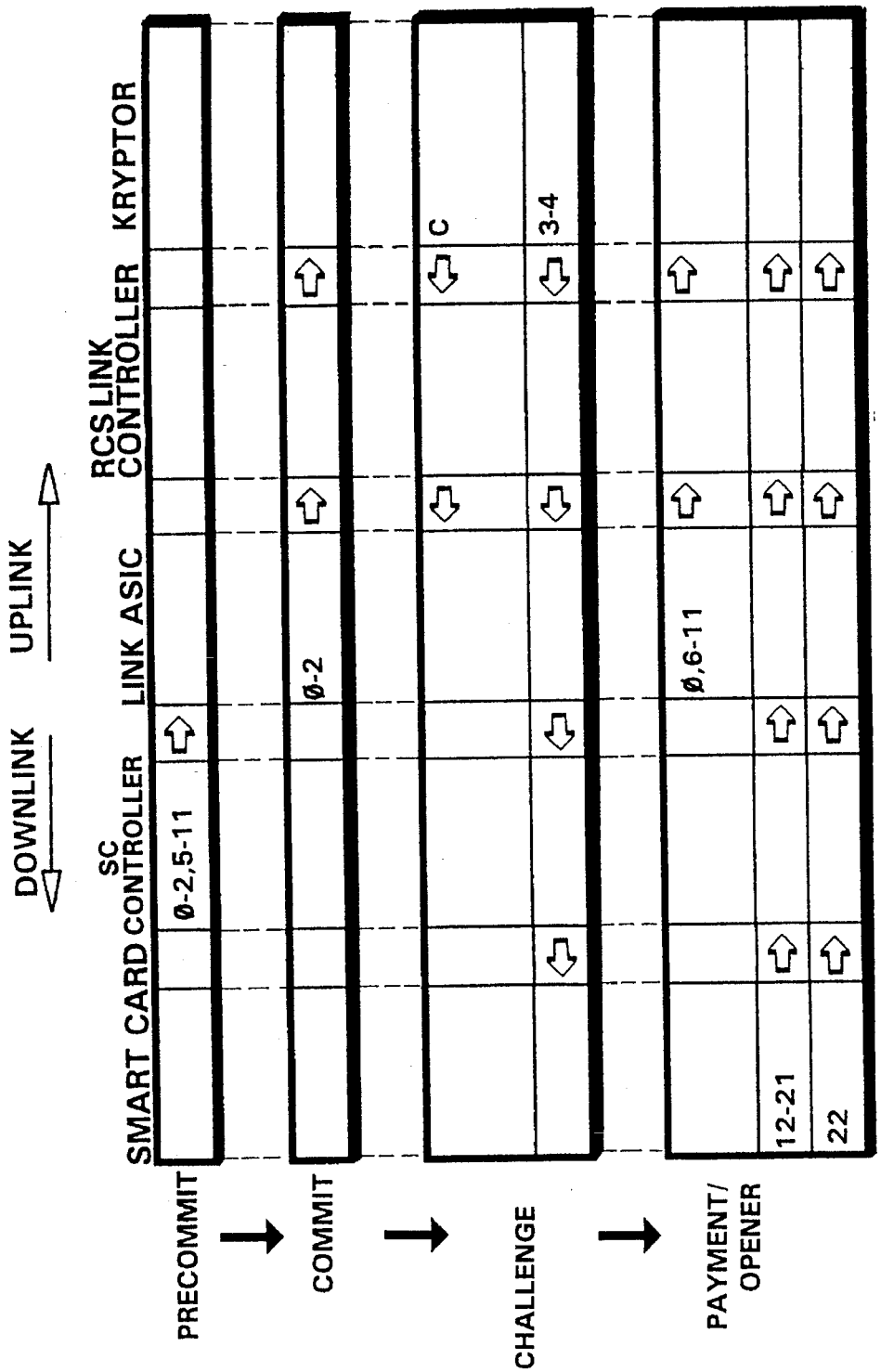
FIG. 5B (COMPLEX FRAME PROTOCOL) (CLOSED ROAD TOLL SYSTEM)

FIG. 5D
SELECT command
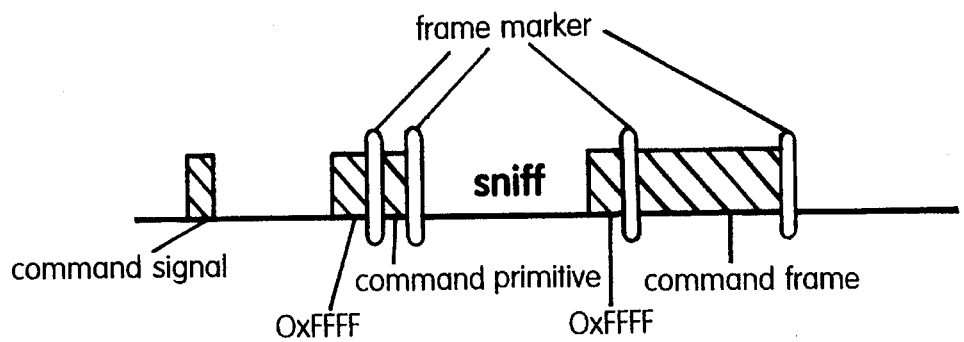
WRITE command
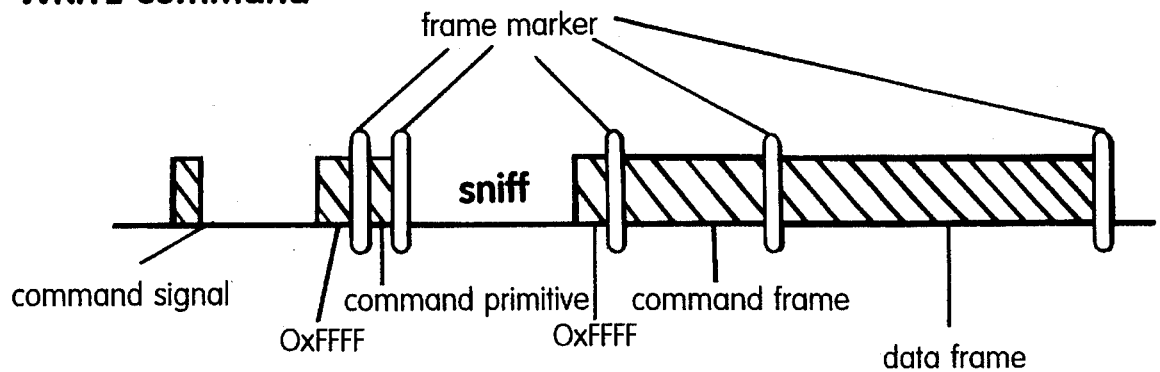
FIG. 5C

AUTOMATIC REAL-TIME HIGHWAY TOLL COLLECTION FROM MOVING VEHICLES

BACKGROUND OF THE INVENTION

1. Field of the Invention

This invention relates generally to automatic real-time highway toll collection from moving vehicles. It is especially adapted to the use of an untraceable electronic check debited from a smart card and communicated in a cryptographically sealed envelope with opener. The invention relates directly to an in-vehicle unit (IVU) and a roadside collection station (RCS) and to an overall system incorporating a plurality of RCS's and IVU's The invention may also find use for parking collections and other types of road pricing applications.

2. Related Prior Art

The microwave communication and cryptographic processing components of this invention are related to the following prior issued U.S. Patents which are hereby incorporated herein by reference:
U.S. Pat. No. 4,075,632—Baldwin et al. (1978)
U.S. Pat. No. 4,739,328—Koelle et al (1988)
U.S. Pat. No. 5,030,807—Landt et al (1991)
U.S. Pat. No. 5,055,659—Hendrick et al (1991)
U.S. Pat. No. 4,759,063—Chaum (1988)
U.S. Pat. No. 4,926,480—Chaum (1990)
U.S. Pat. No. 5,131,039—Chaum (1992)

Numerous electronic toll collection systems have been implemented during the past several years. In most cases, vehicle readers and their associated microwave antennas arc located at well defined toll plazas and readable tags are located on the vehicles. As a tag-equipped vehicle enters the read range of the antenna, a fixed code is read out from the tag. The code is then compared with an online database to verify the account and determine vehicle classification. Next, the user's account is debited by the appropriate amount and the vehicle is permitted to pass. This system is simple in the sense that the amount of data to be handled is typically small and data need pass in only one direction (i.e., uplink). These simplifications can lead to a system which may operate with a relatively low data bandwidth and with reasonably high vehicle speeds.

Sometimes the computation of toll charge is based, in part, upon the identity of the entry plaza at which the vehicle entered the system. In this case, it is necessary to either write the identity of the entry plaza into the tag or to communicate the fixed tag code and associated entry plaza over a network so that each exit plaza in the entire system has online access to the data. Needless to say, both of these alternatives complicate the system, necessite a higher bandwidth, and may prove expensive to implement.

Furthermore, some users may object to loss of privacy since the fixed tag code serves to identify the owner and his or her whereabouts. Low value, off-line payment systems which provide privacy to the user are now gaining commercial acceptance. These systems often make use of a reusable smart card or its predecessor, the disposable memory card.

Automatic real-time toll collection in general has been a long-standing goal of many prior efforts The following U.S. Patents are a few examples of prior systems which proport to provide one aspect or another of such systems:
U.S. Pat. No. 4,303,904—Chasek (1991)
U.S. Pat. No. 5,086,389—Hassett et al (1992)
U.S. Pat. No. 5,144,553—Hassett et al (1992)

As explained by Chasek, conventional manual toll collection facilities slow traffic, waste time and fuel and increase air pollution. Such manual facilities can also be relatively inefficient in terms of overhead costs required for toll collection processes.

Chasek is perhaps typical in prior art approaches to automatic toll collection which propose the use of prepaid tolls inserted electronically in the memory of a microwave transponder-data-processor, normally kept in the vehicle. As the vehicle passes through a suitably equipped toll collection facility, a toll plaza microwave transponder receives billing information from the vehicle transponder, calculates the toll, transmits it back to the vehicle transponder where the toll is electronically subtracted from a stored balance. If the resulting balance is not negative, a pass signal is then flashed. Typical information to be stored hi the vehicle transponder permanent memory and communicated to the toll collection facility would include a vehicle-owner identity code, a collection agent code and a vehicle-class code. The availability of this information permits calculation of the toll. A procedure for increasing the pre-paid balance makes possible a computerized and automated double entry bookkeeping and funds transfer system. Security is said to be achieved by "crypto-insertion codes". The stored current electronic money balance in the vehicle transponder is to be indicated by a liquid crystal display.

Such automatic toll systems may offer some improvement over other prior art techniques employing only automatic vehicle identification (e.g. one-way data communication rather than bi-directional data communication) and involving intricate centralized computer facilities for storing and extracting billing information from potentially tens of millions of possible users for each toll transaction. However, there are nevertheless still drawbacks with such conventional approaches to automatic toll paying. For example, in the Chasek system the toll transaction inherently reveals the identity of the vehicle—and therefore inherently reveals the identity of the vehicle owner/driver. This may provide a significant intrusion into the expected privacy of individuals in a society which is presently accustomed to anonymous highway toll payment transactions using untraceable cash/coins or the like.

Furthermore, the Chasek approach requires an initial interrogation by a microwave transponder located at the toll plaza. This implies at least four phases of required bi-directional communication (e.g. the initial interrogating downlink communication, a first uplink communication of vehicle identification, etc., a second downlink communication of the computed toll amount and a second uplink communication indicating a lack of a negative balance in the vehicle transponder. Not only does the described four-phase communication inherently require a considerable time and loss of anonymity to the transaction, it also fails to effectively provide for real-time cryptographically verified debit of the prepaid electronic money balance. Accordingly, such systems are more susceptible to erroneous and/or fraudulent transactions.

Although Chasek refers to security being achieved by "crypto-insertion codes", the only discussion of any cryptography is a brief reference to the determination of a highway entry code from a given vehicle transponder identification code using a "cryptographic sequence". Presumably this would provide some security against fraudulent toll minimization by use of false highway entry data (for "closed" toll highway situations). However, it does not appear to offer any other security against possible fraudulent activity—and it clearly offers no anonymity to the vehicle owners or operators traveling along the highway.

BRIEF SUMMARY OF THE INVENTION

A presently preferred exemplary embodiment of this invention achieves especially efficient bi-directional automatic toll payment communications utilizing anonymous untraceable electronic checks communicated in cryptographically sealed envelopes with openers while utilizing, if desired, as few as three phases of actual data communication for each complete toll transaction (including a fully cryptographically verified debiting of smart card electronic money). Such efficient communication minimizes the time required to complete each toll transaction and thus facilitates use at high vehicle speeds.

In a non-data-communicating preliminary initialization stage, each IVU prepares an initial "commit" data package which already includes a portion of an anonymous cryptographically untraceable electronic check. Due to the very nature of the data in such package, it is extremely likely to be unique insofar all other toll transactions are concerned. Thus it conveniently also serves as a transaction identity code for authenticating and linking subsequent phases of the toll collection transaction. When an IVU comes within the communication "footprint" of an RCS (i.e., the highway area in which reliable communication with an IVU is possible, or in otherwards, the microwave communication zone), this pre-configured "commit" data package is immediately and repetitively transmitted in an up-link mode to the nearest RCS at a toll plaza. When an RCS detects successful receipt of a valid up-link "commit" data package, then it computes a return down-link "challenge" data package (typically including a computed toll amount based, at least in part, upon vehicle classification, highway entrance point, and perhaps other data included in the first up-link data package). This second "challenge" data package also preferably includes a shortened encrypted version of at least some of the first commit data package (e.g., the transaction identity code) so as to authenticate the RCS (i.e. before the IVU effects a cash disbursement to the RCS). The "challenge" data is communicated on a down-link to the appropriate IVU. When an IVU successfully receives an authentic "challenge" data package (i.e., one carrying transaction identity data associated with its own earlier "commit" data package), then an appropriate toll amount is debited from an associated smart card and suitable completion of the untraceable electronic check in that amount (together with the cryptographic opener, linkage data and cryptographically secured verification of a smart card debit) is collected in a third "payment" data package that is communicated on an up-link from the IVU to the RCS, thus completing one entire toll transaction.

Merely increasing communication bandwidth without limit to accommodate more data transmission in less time (e.g., at high vehicle speeds) is typically not practical due to regulatory constraints on utilized bandwidth. Typically only about 10 MHz of bandwidth is provided by regulation for such applications. Thus there is further need for efficient data protocols.

As already briefly mentioned, since the data representing an untraceable electronic check is extremely likely to be unique with respect to all other toll transactions, a portion of that data is advantageously also utilized as transaction identity data communicated in the first "commit" phase of the bi-directional communication process. A shortened encrypted version of this transaction identity data (e.g. encrypted with a secret Data Encryption Standard or "DES" key shared by the IVU and RCS) may then be returned in the "challenge" data so as to authenticate the RCS to the IVU before a toll debit is effected. In addition, to provide further multi-lane functionality, transaction sequence and/or transaction lane data may be generated so as to be unique within a given plaza environment over a time duration longer than any expected toll transaction. This additional transaction identification data may be included in the "challenge" and "payment" phases of each transaction so that a given RCS may appropriately associate different data packets involved in a given transaction and thus simultaneously process toll transactions with a plurality of IVU's. A higher level local area network is also preferably provided between RCS's at a multi-lane facility so that cross-lane data may be redirected at the higher LAN level to the appropriate RCS. Such cryptographically secure transaction linkage data (e.g., the transaction identity data, the transaction sequence data and/ or the transaction lane data) is also preferably utilized to provide undeniable proof of toll payment in case the smart card is actually debited by the toll amount but, for some reason, such debiting is not properly recorded by the RCS and, as a consequence, enforcement provisions are subsequently taken against the vehicle in question (e.g. by triggering a photograph of the vehicle license plate).

The preferred exemplary embodiment also utilizes a down-link timing controller so as to coordinate downlink communication on adjacent lanes and avoid potential cross-lane down-link interference by preventing simultaneous downlink communication on adjacent lanes (and/or nearby lanes) of a multilane toll plaza.

If desired, the system may be designed with an ability to handle both "open" and "closed" toll highway configurations. In an open toll highway, a fixed toll may be charged for each vehicle (or vehicle class) at each toll plaza. In a closed highway environment, a particular toll is typically computed as a function of the highway entrance point for a particular vehicle. Such entrance point identity would be communicated through the IVU by an RCS located at the entrance point and then stored so as to become part of the first "commit" phase of communication by the IVU when it next encounters an RCS at some toll plaza along the highway (e.g., possibly at an exit ramp).

The exemplary embodiment of this invention is particularly designed primarily for use in a pre-payment environment (e.g. where there is sufficient pre-paid electronic money in the IVU-associated smart card to pay the requested toll). However, if desired, the same system may also be arranged to handle post-payment scenarios. For example, if a drive realizes that his or her smart card may not contain sufficient remaining electronic money to pay the upcoming toll, then the WU may be conditioned (e.g. via suitable keyboard entry) to revert to an optional post-payment mode wherein vehicle/person identity is transmitted to the RCS. This permits the RCS and associated toll plaza computer to generate a post-payment bill or invoice to the appropriate alternate charging process (e.g. an approved credit card, post-payment billing system, etc.). A PIN code may be required before post-payment is permitted to minimize the chance of a smart card revealing the identity of its owner without the owner's consent.

In the preferred exemplary embodiment, all real time data processing and data communication is done within and between the IVU and RCS. In the exemplary embodiment, art IVU begins the data dialog when it self-triggers itself into an up-link mode of operation as a result of detecting a predetermined threshold of ambient rf level from an RCS. In the preferred exemplary embodiment, modulated backscatter of a continuous wave (CW) microwave signal is used to transmit data in the up-link data direction. Accordingly, each RCS normally operates in a passive uplink mode so as to provide the requisite CW microwave carrier signal enabling an up-link data transmission as soon as an IVU comes within its communication footprint.

To better permit the requisite high speed real time data processing and communication events required for real time automatic toll collection, the smart card utilized in the exemplary embodiment is preferably configured to process data and to communicate in a high speed mode when interfaced with an IVU. However, the stone smart card may revert to standard slower speed processing and data communication at other times such that the electronic money contained in the smart card may be used for other purposes in addition to automatic toll collection.

A bidirectional microwave communication link employing modulated backscatter for short range high speed data communications suitable for use with this invention is known in the prior art. For example, reference is made to the following prior issued U.S. patents, the entire content of each of which is hereby incorporated by reference.

U.S. Pat. No. 4,075,632—Baldwin et al (1978)
U.S. Pat. No. 4,739,328—Koelle et al (1988)
U.S. Pat. No. 5,030,807—Landt et al (1991)
U.S. Pat. No. 5, 055,659—Hendrick et al (1991)

Cryptographic processes for use in generating and communicating anonymous untraceable electronic checks communicated in cryptographically sealed envelopes with openers and suitable for use in the exemplary embodiment of this invention are also known in the prior art. For example, the reader is referred to the following related prior issued U.S. patents, the entire content of each of which is hereby incorporated by reference:

U.S. Pat. No. 4,759,063—Chaum (1988)
U.S. Pat. No. 4,926,480—Chaum (1990)
U.S. Pat. No. 5,131,039—Chaum (1992)

As those in the an will recognize :from the Chaum references, a blind signature system utilizing public key cryptography (e.g. the Rivest Shamir-Adleman or "RSA" cryptosystem) may be used for generating cryptographically secured anonymous untraceable electronic checks which may be communicated, for example, in a cryptographically sealed envelope with opener. Besides anonymity in cash transactions, the use of such public key cryptographic blind signature systems also provides enhanced cryptographic security while yet relaxing the requirements for tamper resistant or tamper proof enclosures for various system components. In particular, as those in the art will appreciate, in a public key cryptosystem, only one key (e.g., the private key) of a public key cryptosystem pair needs to be treated in tamper resistant or tamper proof manner. Accordingly, if one can arrange to use the private key only at a relatively few and secure locations (e.g. at the premises of a bank when a smart card is being filled with electronic money), then one can minimize the need for relatively expensive and complex tamper proof or tamper resistant facilities elsewhere in the cryptosystem. A high speed version may use a secret key shared between a tamper-resistant IVU (SC) and a tamper-resistant RCS.

Instead of a removable smart card, the IVU may itself permanently incorporate a smart card chip (i.e., to be used in lieu of a removable smart card). Such an IVU could be more easily sealed for exterior mounting such as might be required on motorcycles and the like. Such an IVU could also be produced at less cost and in a smaller size. All attributes regarding privacy and security would be preserved.

However, use of such public key cryptography typically suffers the disadvantage of requiting more voluminous data transfers (i.e., larger bandwidth) than for conventional cryptosystems (e.g. as in DES or the like where a single secret key is utilized by both the message sender and the message receiver and where both the message sender and receiver must therefore maintain such secret key and trouper proof or tamper resistant facilities). Accordingly, if more sophisticated public key cryptographic systems are to be utilized in an automatic toll payment system, then it is especially necessary to utilize very efficient data communication protocols and formats so as to ensure that there is ample time available for communicating all of the requisite data within a very short time window (which varies inversely with vehicle speed). The need for me of sophisticated data formatting and protocols becomes especially significant when multi-lane environments are envisioned and/or when multiple simultaneous IVU toll paying transactions are envisioned at multi-lane toll plazas and the like. To accomplish all of these desired goals, extremely high data security and communication efficiency must be simultaneously achieved. This invention provides a particularly secure and efficient way to organize and operate such an automatic real time highway toll collection system.

BRIEF DESCRIPTION OF THE DRAWINGS

The invention will be more completely understood and appreciated by careful study of the following more derailed description of a presently preferred exemplary embodiment of the invention taken in conjunction with the accompanying drawings, of which:

FIGS. 2A, 2B and 2C depict exemplary operation of a downlink timing controller so as to prevent interference between adjacent lanes in the multi-lane environment of FIG. 1;

FIG. 3 is a block diagram of an exemplary in-vehicle (IVU) for use in the embodiment of FIG. 1;

FIG. 3D is a schematic depiction of the link ASIC (application specific integrated circuit) utilized in the FIG. 3 IVU;

FIG. 4A is a logic block diagram of an exemplary uplink control process for use in she RCS of FIG. 4;

FIGS. 5, 5A and 5B depict data package flows in the exemplary embodiment of FIG. 1 for both uplink and downlink communication; and FIGS. 5C and 5D depict exemplary WRITE and SELECT command signalling sequences.

DETAILED DESCRIPTION OF THE DRAWINGS EXEMPLARY EMBODIMENT

Figure 1:
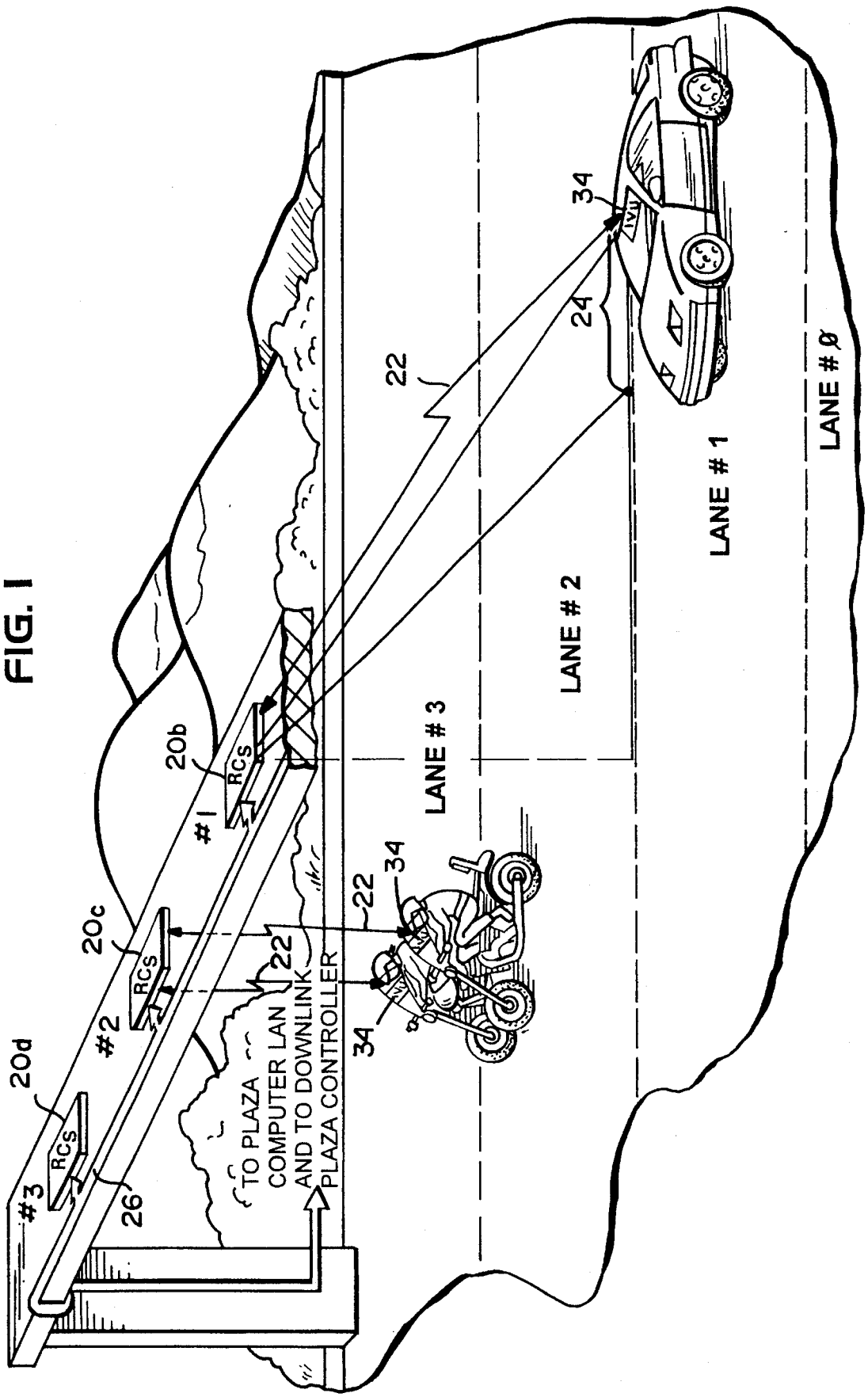
FIG. 1 is a diagrammatic perspective view of a multi-lane toll plaza incorporating an exemplary automatic real time highway toll collection system in accordance with this invention.

FIG. 1 schematically depicts a typical multi-lane toll plaza environment having four lanes (0–3) respectively associated with roadside collection stations (RCS) 20a (not shown), 20b, 20c, 20d. Each RCS communicates over a high speed short range microwave or rf communication link 22 with in-vehicle units (IVU) 34 located in either a single vehicle in its respective lane (e.g. see lane 1 in FIG. 1) or plural vehicles in its respective lane (e.g. see the pair of motorcycles in lane 2 of FIG. 1) while the vehicle passes through an RCS communication footprint 24. In this document the terms the microwave and/or rf are used to refer to any portion of the 4adio frequency spectrum suitable for a short-range communication between an IVU and RCS. As will be appreciated, the dimensions of the footprint are a combined function of the radiation pattern of the rf antennae associated with both the RCS and the IVU. The limited time duration over which a given IVU is present within the RCS communication footprint 24 (which time duration will, of course, also be inversely related to vehicle speed) places a very severe limitation on the time that is available to complete a bi-directional toll payment transaction. For typical speeds and antenna radiation patterns, it is presently anticipated that only a relatively few milliseconds may ultimately be available to complete such a transaction. Given the vagaries of microwave communication over short ranges between relatively moving antennae and the need to communicate reliably a considerable quantity of data requires highly efficient data protocols and formats.

As will also be appreciated, the multi-lane toll plaza environment of is quite possible for an IVU in one of the lanes to successfully pass uplink data to an RCS other than the RCS that is nominally associated with that vehicle's actual highway lane. Unless constrained in some manner, it is also possible that a vehicle may be changing lanes during passage through the toll plaza. To accommodate reconciliation of cross-lane data read-in and to otherwise provide timing control over downlinks (and thus to help minimize cross-lane downlink interference between adjacent lanes), the RCS units 20 are interconnected with a plaza computer local area network (LAN) and a downlink plaza timing controller via cabling 26.

Figure 2:
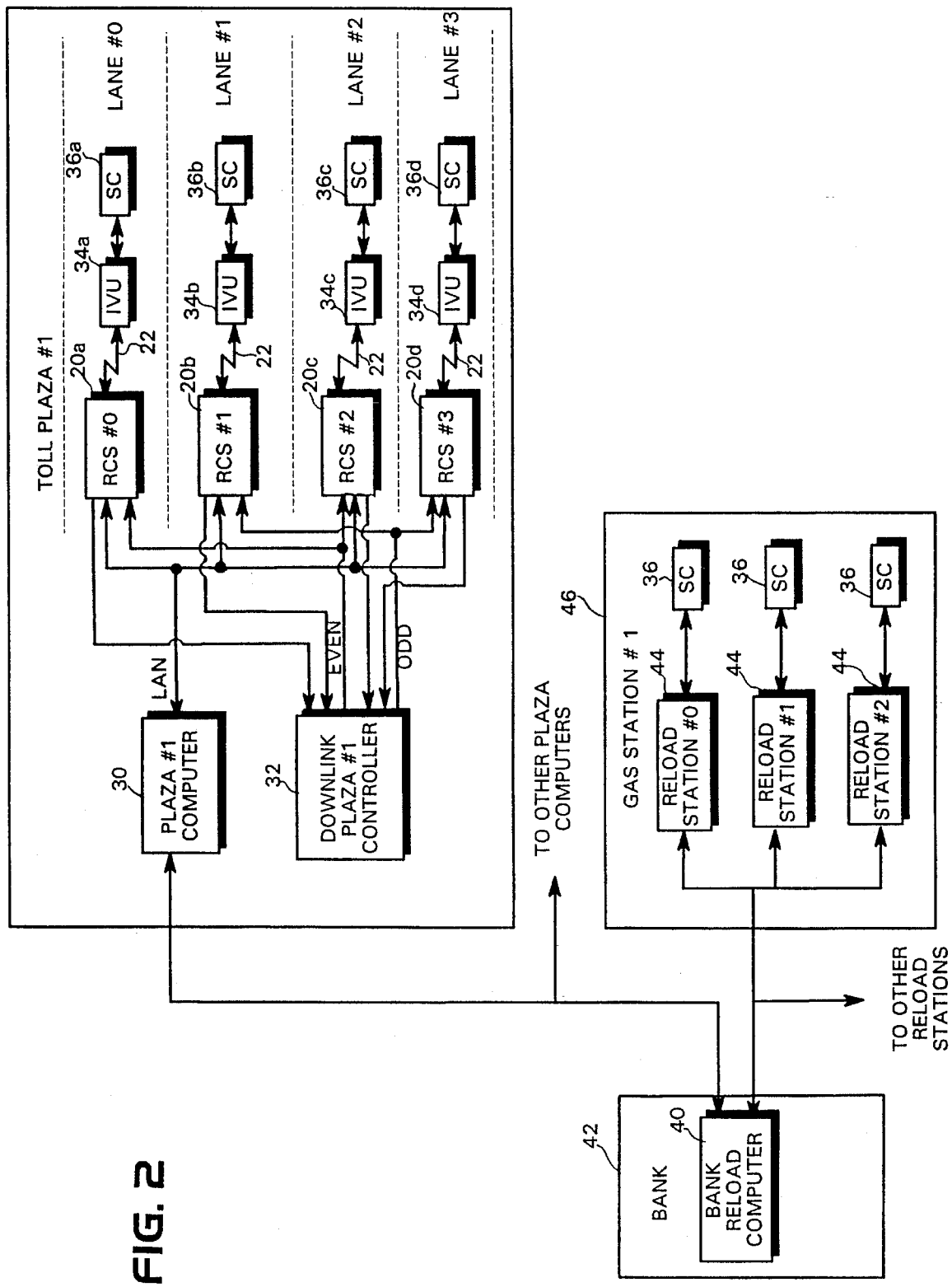
FIG. 2 is a block diagram of some major toll collection system components in the exemplary embodiment of FIG. 1.

A block diagram of the exemplary system is depicted in more detail at FIG. 2. Here, toll plaza 1 is schematically shown to include four lanes, each of which is respectively associated with an RCS 20, the RCS's 20a–20d being interconnected with plaza 1 computer 30 (e.g., a 486-based 33 MHz 8 MByte RAM 40 MByte hard disk PC with special application software running under Windows V3.1) and downlink plaza 1 controller 32 via a LAN and other wiring within cabling 26. The high speed short range bi-directional microwave communication links 22 are also depicted with the in-vehicle unit (IVU) 34 of an associated vehicle travelling along that respective highway lane. As depicted, each IVU 34 is interconnected to a respectively associated removable smart card (SC) 36a–36d. In turn, plaza 1 computer 30 is interconnected with other plaza computers at other toll plazas and to a bank reload computer 40 (e.g. via a dial-up link, exchange of floppy disk or tapes) typically positioned in a secure (i.e., tamper resistant or tamper proof) bank facility 42. Reload stations 44 may then be remotely connected to the bank reload computer 40 via another LAN (e.g. wireload stations being located at a gas station 46 or the like as illustrated in FIG. 2). A smart card 36 may then be removably interconnected with a reload station 44 and reloaded with electronic money in a cryptographically secure way via the bank reload computer 40 (which may be located in a tamper resistant or tamper proof bank environment if the private key of a public key cryptosystem pair is required as part of the reloading process).

The Reload Computer may be installed with an internal Kryptor (a high speed RSA/DES encryption device) mounted in an ISA expansion slot. The Kryptor (a high speed RSA/DES encryption device) generates blank electronic checks and balance data tier transmission to a remote Reload Station. The Reload Station 44 is the physical device into which the smart card is inserted for receiving blank checks and a balance. The Reload Station can be physically the same as a DigiCash PayStation (available from DigiCash b.v., 419 Kruislaan, 1098 VA Amsterdam, The Netherlands), but with firmware suitably adapted to the toll application. The Reload Station may be linked to the Reload Computer over a twisted-pair LAN operating at 38 KBaud.

The plaza area network (LAN) that links the Plaza Computer with one or more RCS's, Reload Computers and Reload Stations may be a multi-access, twisted-pair, asynchronous network using RS485 signal levels capable of data rates up to 38 KBaud and distances up to 1 Km.

The general type of short range microwave communications link employed in the exemplary embodiment has already been successfully applied within the European rail network. For example, in a railroad environment, modulated backscatter has been used to provide automatic vehicle identification (AVI) with backscatter data modulator "tags" being located on the underside of rail vehicles and an active microwave CW source RCS link controller being located on the ground between the rails. The same technology has also been applied in reverse to automatic train control (ATC) with the CW active microwave interrogator located on the underside of locomotives and backscatter data modulator "tags" located on the ground between the rails. Existing interrogators and tags using such communication technology are commercially available as part of the Dynicom system (a short range microwave communication system) from Amtech Corporation, 17301 Preston Road, Building E100, Dallas, Tex. 75252.

The controlling firmware and hardware in such existing commercially available units may be modified so as to support high performance smart card-based road pricing applications in accordance with this invention. In such specialized road pricing applications (e.g., toll payments), uplink data received from the IVU must be cryptographically processed in real time (e.g. in suitable cryptographic data processing circuits also associated with the RCS) since the result of such computations on uplink data is necessary to generate downlink messages back to the IVU in real time. The IVU, in turn, must perform real time processing of downlink messages in order to generate concluding uplink messages which, among other things, cryptographically verify the actual completed debiting of electronic money from an associated smart card. Thus, each road pricing transaction requires a sequence of at least three (i.e., uplink, downlink, and uplink) me;sages. For special purposes, additional data messages may also be necessary or desirable as will be appreciated by those in the art.

Consequently, the demanding real time nature of road pricing applications require optimization of: 1) reporting of uplinked data received from the IVU to the cryptographic data processing circuits at the RCS, 2) high speed communications between the microwave data communication circuits and the cryptographic data processing circuits using an efficient inter-circuit protocol at the RCS, and 3) efficient downlink data transmissions from the cryptographic data processing circuits to the IVU with automatic verification and retry capabilities.

The RCS and IVU of this invention support a bi-directional short range microwave communication link. The link may operate in a half duplex mode (i.e. where transmission occurs in only one direction at a time). In the exemplary embodiment, initial data communication occurs from the IVU to the RCS (which is defined as the "uplink" direction of data transmission). The RCS may switch the direction of data communication by transmitting a special primitive listen command to the IVU. Once the IVU switches from a transmit to a listen mode, then data transmission from the RCS to the IVU may be initiated (and this is defined as the downlink direction of data transmission). Once the RCS completes a downlink message, it automatically reverts to the passive, uplink mode in anticipation of receiving uplink data packages.

Unfortunately, when modulated downlink microwave transmissions are employed, it is easy to have cross-lane interference if two adjacent RCS's simultaneously transmit downlink data. As will be appreciated, there may be direct interference between closely spaced and/or overlapping radiation patterns of microwave signals nominally operating at a relatively closely spaced carrier frequency on adjacent lanes. In addition, in a real life toll plaza environment, such microwaves may easily be reflected from surfaces such as the sides of passing vehicles (e.g. large metallic truck bodies and the like) so as to came temporary dislocation of the intended radiation pattern from one lane into an adjacent lane.

Accordingly, in accordance with the exemplary embodiment of this invention, a downlink timing plaza controller 32 is employed to ensure against simultaneous downlink communications from RCS's in adjacent lanes. One possible arrangement is depicted at FIG. 2A where downlinks are permitted only simultaneously in even numbered lanes for a first time period and then in odd numbered links for a second time period—followed by a time slot during which CW microwave power is provided so that uplink communications are permitted to occur (from all lanes simultaneously). In the embodiment of FIG. 2A, a relatively longer time period is provided for uplinks where a more complicated and secure public key cryptosystem form of cryptography is utilized (thus requiring the transmission of relatively greater amounts of data in the uplink direction while also permitting greater use of relatively cheaper non-tamperproof equipment disseminated throughout the system). The embodiment of FIG. 2B is similar to that of FIG. 2A except that a relatively shorter time is provided for uplinks (as would be the case, for example, where less sophisticated cryptosystems are utilized with the attendant need to provide more secure tamper-proof components disseminated at critical points throughout the system).

While it is possible to realize the downlink plaza timing controller 32 as a fixed clock granting alternate even-numbered and odd-numbered lane downlinks to occur between suitable uplink time periods, it is possible to make more efficient use of time in lighter traffic environments where it may be necessary to provide downlink from both even and odd lanes during a given time period. For example, the downlink plaza controller 32 may comprise a programmed microprocessor operated in accordance with an optimizing programmed process similar to that depicted in block diagram form at FIG. 2C. Here, the downlink controller 32 would most commonly be found operating in a tight loop around the downlink request query 50 (e.g. testing for the presence of any downlink communication request from any one of the RCS's at this particular plaza). Once such a downlink request has been detected, then control would pass to block 52 to determine whether the request has emanated from an odd or even numbered lane. If an even numbered lane is requesting a downlink, then that request may be immediately satisfied by beginning the grant of an even-numbered lane request at 54 and thereafter continuing to test for more possible incoming requests at 56 (e.g. during the ongoing already granted downlink for even lanes). If not, then control may be immediately be passed to block 58 where the granted even lane downlink request may be extended if feasible (e.g. to more assuredly permit a successful downlink communication and/or to permit possibly additional downlink communications to occur on even numbered lanes provided that there is still sufficient RCS communication footprint time available to complete a transaction). On the other hand, if additional requests are detected at 56, then a test is made at 60 to determine whether the additional new requests come from odd or even numbered lanes. If the new requests come from even numbered lanes only, then control is again passed to block 58 for processing as already described. However, if additional requests have been detected from odd numbered lanes, then control is passed to block 62 where the added lane downlink request is granted (e.g. an additional two milliseconds for downlink communication in the odd lanes) at the expiration of the just previous granted downlink communication (e.g. in even numbered lanes). Thereafter, control is passed to block 64 where uplink communications are enabled by transmitting from the RCS's only modulated CW microwave power. When the uplink mode times out, control is again passed to block 50 to poll for more downlink requests.

Figure 2C:
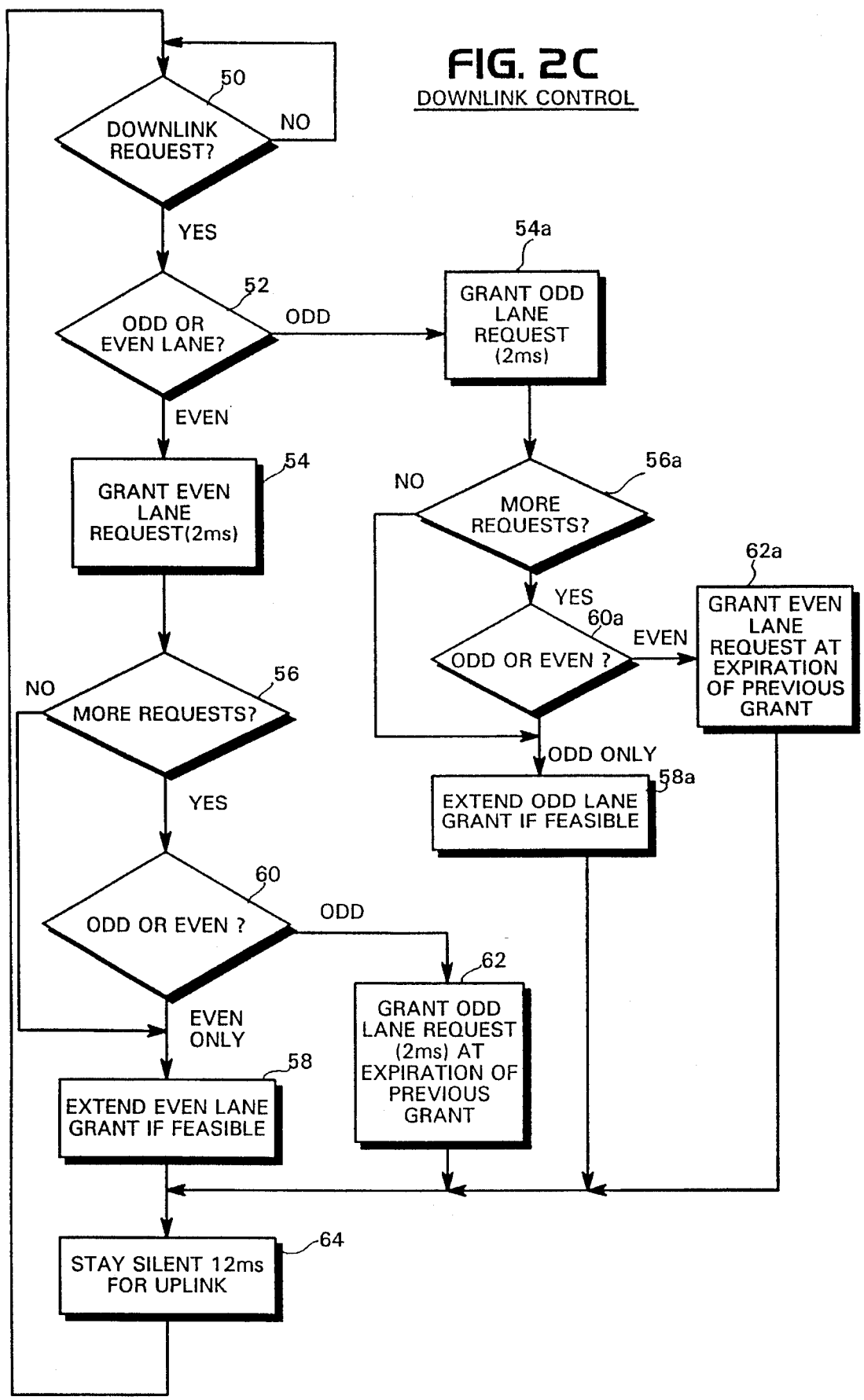

Of course, if at block 52 the first detected request had been for an odd lane, then control could have passed to block 54a and subsequent blocks 56a, 58a, 60a and 62a which are all directly analogous to blocks 54-62 except for the interchange of odd and even-numbered lane associations as should now be apparent from FIG. 2C. More sophisticated downlink timing control could provide individual grants as requested—for as long as necessary to successfully conclude the downlink phase or until a predetermined time-out— so long as no downlink requests are simultaneously granted for adjacent lane RCS's.

As may be appreciated, as traffic density increases in the multi-lane environment, then operation of an optimization downlink control process such as that depicted in FIG. 2C may ultimately tend toward fixed time allocations such as depicted in FIGS. 2A or 2B. It is possible, in this example, to provide three or four downlink grants during the 10 to 20 milliseconds duration of an RCS communication footprint with an IVU—thus helping to ensure a successful completed toll transaction at some point.

Multi-lane operations may involve IVU-equipped vehicles travelling freely in two or more adjacent lanes. In the multi-lane environment there may be the opportunity for interference between adjacent RCS's and there may also be the opportunity to confuse IVU's between closely spaced adjacent vehicles (e.g. motorcycles). In addition to downlink-to-downlink multi-lane interference, it is also possible to have interference between a downlink and an uplink in adjacent lanes. This latter problem arises when a particular RCS is trying to receive an uplink message while any other RCS is transmitting a downlink message. Experience has shown that the transmission of a downlink message is likely to corrupt uplink messages across the entire plaza. This particular problem also may be solved by ensuring that all stations restrict downlink message transmissions to a selected time window authorized by the downlink controller (i.e., downlink grant interval). Thus, no RCS will be required to receive uplink messages during an interval in which some other RCS is transmitting a downlink message.

Figure 2D:
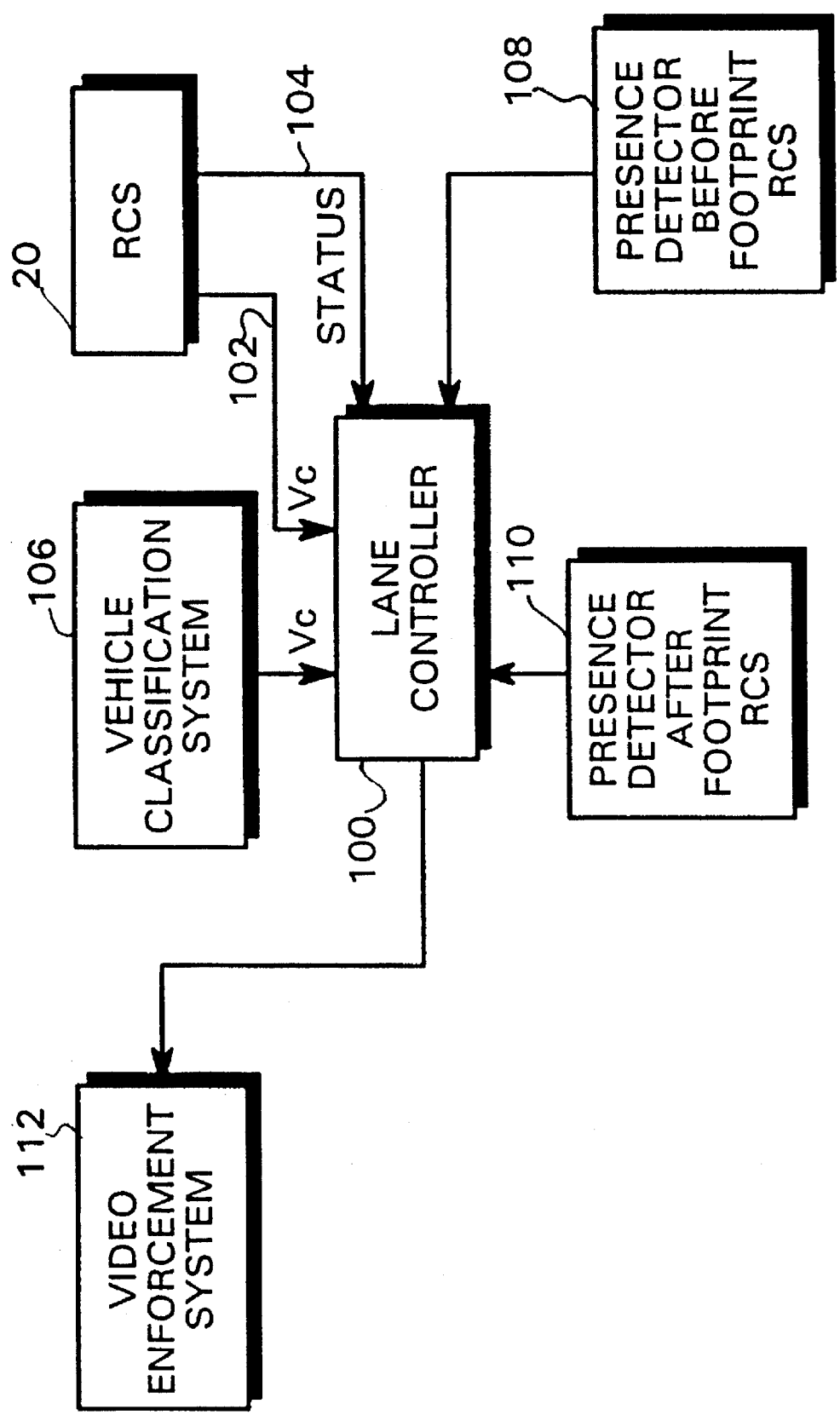
FIG. 2D is a simplified block diagram of a possible violation enforcement subsystem for use with the embodiment of FIG. 1.

As part of an enforcement system, a programmed (or hard-wired) lane controller 100 may be provided as shown in FIG. 2D for each lane of traffic at the toll plaza. Here, an RCS 20 provides vehicle classification information on line 102 (e.g. as provided by uplink data communications from the IVU involved in a current toll payment process) as well as payment status information (e.g. the toll amount actually paid, if any, as indicated by cryptographically secured uplink payment verification data) on line 104. Via other conventional vehicle classification detection systems 106, the lane controller also receives vehicle classification data in an independent manner for the same vehicle then passing through a particular lane of the toll plaza. Yet further, the lane controller may have conventional vehicle presence detectors 108 (located before the RCS communication footprint) and 110 (located after the RCS communication footprint). In this manner, the lane controller 100 may verify that vehicle classification information is correct and that cryptographically verified payment of the correct toll amount for that classification of vehicle has actually been received before presence detector 110 indicates that the vehicle has passed beyond the RCS communication footprint. If any monitored event fails to be satisfied at that time, then the lane controller 100 may trigger a conventional video enforcement system 112 or otherwise call attention to the possible nonpayment of a proper toll by a particular vehicle (e.g. by applying some sort of detectable marker to the vehicle, by triggering an alarm, etc.).

As explained, the smart card is debited just prior to the moment the IVU issues the payment message. However, in some cases, the vehicle may exit the microwave communication zone prior to the correct readout of all payment frames by the RCS. In this case,, the smart card would have been correctly debited, but verification of payment would not have been received by the RCS. This event will trigger the enforcement system and cause a fine to be issued to the owner of the vehicle.

In such circumstances, the system architecture is designed to allow the vehicle owner to prove that he made payment and, thereby, avoid the free. In order to achieve this capability, the IVU maintains an 8 digit alphanumeric code corresponding to each transaction correctly debited. Once the notice of fine is received, the vehicle owner may send to the toll authority the code corresponding to the transaction in question as proof of payment. In the event that the vehicle exits the microwave communication zone prior to the receipt of the challenge message, no payment data shall be released by the IVU and the smart card shall not be debited. In this instance, the vehicle owner shall be required to remit the toll and any associated fines.

The above-referenced cryptographically secured electronic money provides a smart card-based toll payment system that is advantageous in at least two ways. 1) it provides off-line pre-payments with multi-party security using a sophisticated public key cryptosystem and 2) it provides a highly efficient cryptographically secure payment system. It is believed feasible to support smart card-based road-pricing toll payment systems with transactions times of less than a few (e.g., 17) milliseconds. The exemplary cryptosystem secured electronic money in smart cards is currently available from DigiCash b.v., 419 Kruislaan, 1098 VA Amsterdam, The Netherlands, and is currently in use for payments within office buildings where the smart card can be used for purchasing coffee, paying for food, making photocopies or sending facsimiles. Even though an extremely sophisticated cryptographically secured electronic money system is involved, it nevertheless can be used even for such low value payments because of its very low transaction costs (e.g. due to the possible offline verification of anonymous electronic checks and a cryptographically sophisticated public key cryptosystem which eliminates the need for tamper-proof payment terminals).

The present invention, in effect, integrates, adapts and improves the prior Amtech and DigiCash technologies so as to achieve a smart card-based road pricing system complete with bi-directional microwave communication link.

A block diagram of an exemplary IVU 34 is depicted at FIG. 3. The microwave antenna 300 provides a transducer for both downlink and uplink communications with an RCS. Current microwave frequency allocations for application such as here involved may typically occur within bands located at approximately 915 MHz, 2.5 GHz and 5.8 GHz. The antenna may be of any acceptable conventional design providing appropriate gain (e.g., perhaps 10 dB) and directivity (not so important for the IVU). A relatively small multi-element microstrip patch antenna array is probably best suited to the relatively high frequency microwave environment and relatively small acceptable size limits for the IVU. Typically, the IVU may be only slightly larger than the usual credit card or smart card and may be affixed in any convenient way (e.g. with Velcro® fasteners in the windshield area of the vehicle) so as to provide unimpeded microwave communication with an overhead RCS. If the RCS is mounted on an overhead gantry then the top center portion of the windshield above the rear view mirror may be preferred. If a roadside RCS mounting portion is used, then a lower left hand (driver) side windshield position may be preferred.

The analog rf circuits 302 include a conventional downlink microwave data demodulator 304 and a conventional uplink microwave data modulator 306 so as to provide uplink/downlink logic/rf data links to/from the IVU link ASIC 308. As will be examined in more detail in connection with FIG. 3D, the link ASIC 308 may be any suitable custom ASIC (e.g., an existing ASIC available from amtech designed specifically for bidirectional communications across a microwave link) which provides a communication interface and buffer in both the downlink and uplink directions. It is interfaced with the IVU link controller (e.g. any suitable microcomputer, e.g., a Motorola® 68 HC 705) that interfaces, in turn, with a smart card controller 312 (another suitable microcomputer, e.g., a Motorola 68HC11). The smart card controller 312 is connected to smart card 36 (e.g., a Motorola 68 HC055C21) at a conventional removable electrical contact smart card connector interface 314. Human interface is provided via keypad 316 and LCD display 318, LCD's 320 and 322 (or a suitable single multi-color LED to provide, e.g., green and red signals representing acceptance or non-acceptance, of payment, or similar types of yes/no go/stop status indications) and an audible output buzzer 324 (e.g., to audibly interrupt the user's attention when urgent user control is needed or to audibly indicate success, failure or key click sounds). The primary function of the buzzer is to provide audio feedback without the necessity of reading the LCD display and/or LED's.

Figure 3A:
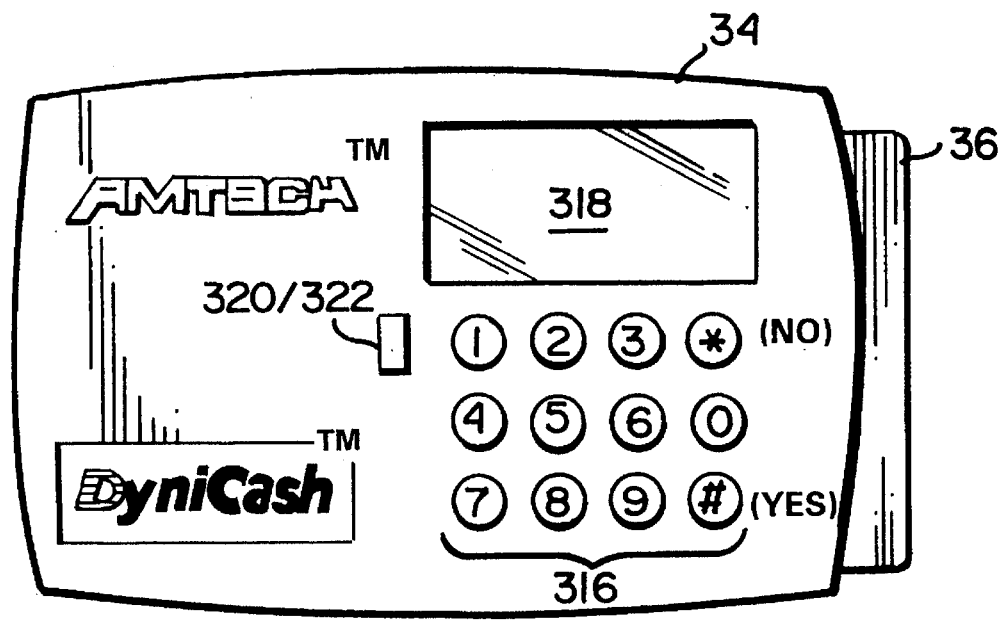
FIGS. 3A and 3B depict an exemplary housing and a possible keyboard/screen user interface for the IVU of FIG. 3.
Figure 3B:
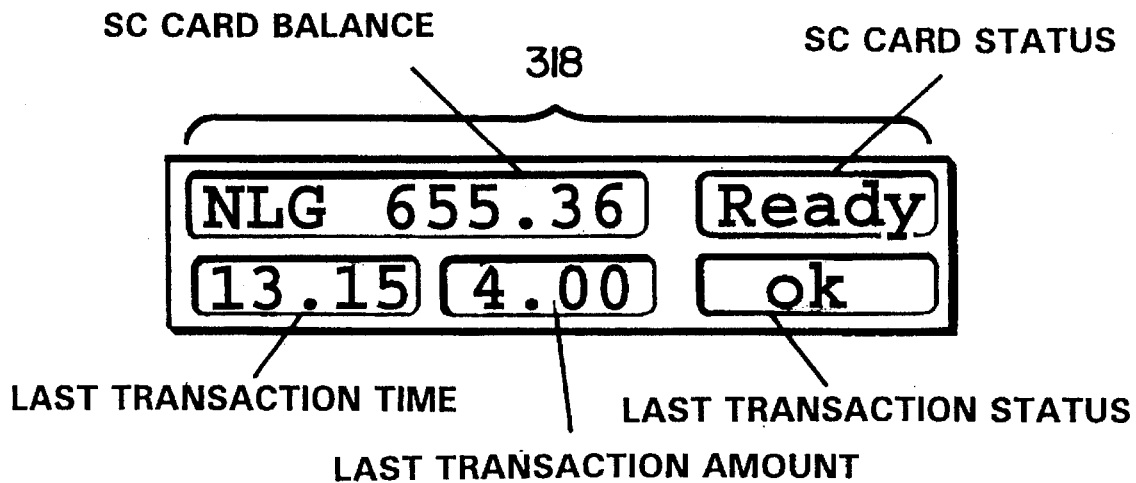

The IVU 34 is pictorially represented at FIG. 3A with smart card 36 inserted therewithin. The keyboard is self-evident as is a multi-color LED 320/322. The LCD display 318 is depicted in more detail at FIG. 3B. The LCD display 318 may include, for example, a display of the current smart card balance, the current smart card status, the time of the last transaction, the amount of the last transaction and the status of the last transaction (the two status fields providing human interface for evoking keyboard responses from a human operator so as to cause the smart card controller to index through human interface compute program (firmware) modules such as depicted in FIG. 3C).

Figure 3C:
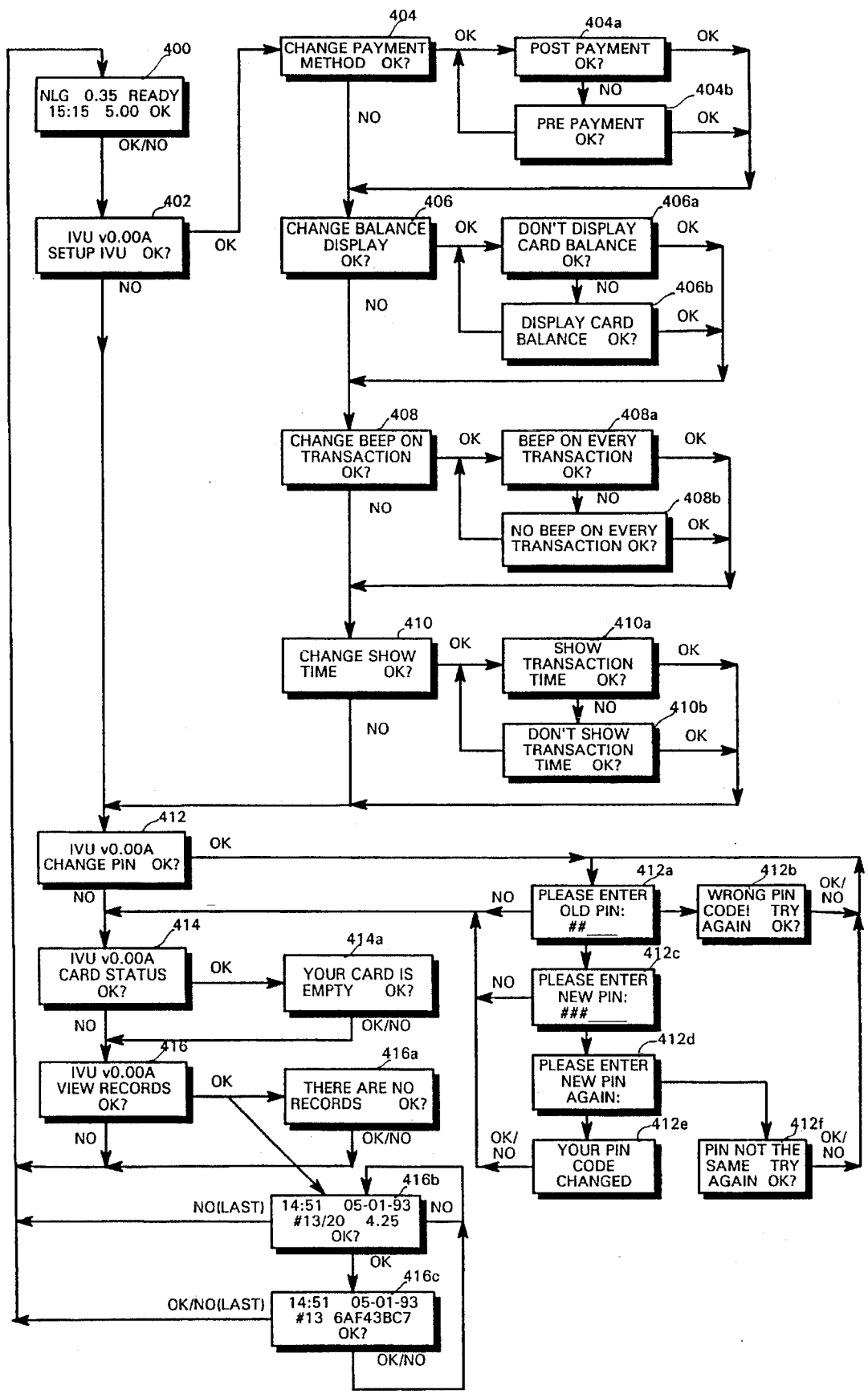
FIG. 3C is a logic sequence human interface diagram showing an exemplary human interface with the IVU of FIGS. 3, 3A and 3B.

For example, as depicted at FIG. 3C, the nominal quiescent state of smart card and smart card controller 312 may be as shown in block 400 where the pressing of any key causes one to transfer to block 402. There a status indication in the display asks an operator whether set up of the IVU is requested. If the answer is "yes", (e.g. as may be signalled via a predetermined one of the keys on the keyboard 316), then control is transferred to block 404 where the operator is requested to determine whether a change is required in the payment method. If so, then selection between post-payment and pre-payment techniques is selected at blocks 404a and 404b respectively before control is passed back to block 406 (to which control is also passed if the operator indicates that no change in payment method is requested). As should now be self evident from FIG. 3C, similar operator interface changes may be effected at blocks 406, 408 and 410 (in association with the respectively associated sub-decision blocks similarly numbered but with suffixes a and b). At block 412, the operator may enter a sequence of operations 412a through 412f for changing his or her personal identification number (PIN). Card status may be checked at block 414 (and 414a) while the prior transaction data (if any) may be checked by the operator at interface 416 (and related blocks 416a–416c) before control is returned back to the nominal quiescent state 400. As will be recognized, many different human interfaces of this type may be devised and used with the IVU 34.

The link ASIC depicted in more detail at FIG. 3D is similar to that used in the prior Dynicom system. A frame RAM 500 is organized into two pages 0 and 1, each containing 32 frames of data, each frame containing 128 bits. In the exemplary system, the smallest data package for transmission in the uplink and downlink directions is a single frame of 128 bits. A scroll RAM 502 of 5 bit frame and 1 bit page RAM addresses is provided. These addresses point to particular frames and page of RAM 500 which can thereafter be repetitively and sequentially addressed and output to the uplink modulator 306 (via suitable logic circuits 504 e.g. to suitably format and time inputs to the uplink modulator 306). In the exemplary embodiment, the first pointer in the scroll RAM 502 actually defines the number of subsequent active address pointers in the scroll RAM list 502 for scrolling at any particular time. The number of immediately subsequent entries in the scroll RAM 502 then point to successive frames of the RAM 500 that are to be sequentially transmitted upon command from the link controller microprocessor 310. As will be appreciated, the link controller microprocessor 310 also controls the content of the scroll RAM 502. In addition, data from the downlink demodulator 304 may be selectively written into suitably addressed frames of RAM 500 via suitable processing logic 506.

As depicted in FIG. 3D, the link ASIC 308 conveniently may also be utilized to control rf detector ram-on functions. In a normal quiescent mode, most of the IVU circuits will be turned "off" so as to conserve battery power. However, when ambient rf energy at the proper frequency and above a predetermined threshold level is detected, it is assumed that the IVU is approaching or within the communication footprint of an RCS. In response to such detection of a predetermined level of rf carrier, the IVU circuits automatically are fully turned "on" and the IVU immediately assumes the "commit" mode of uplink data communication so as to repetitively scroll and send to the nearby RCS one or more predetermined and preformatted frames of data from RAM 500.

The rf carrier detection may be effected by a suitable comparator 508 comparing a predetermined toll plaza rf detector reference level to any detected ambient rf carrier and thus turn "on" the remainder of IVU 34. As should now be appreciated, the link controller 310 is suitably programmed in the exemplary embodiment so as to begin its operation in the "commit" phase by repetitively transmitting a first data package on the uplink to the presumed nearby RCS. Such operation continues until either a time-out expires following the loss of microwave signal or until the presumed nearby RCS has successfully received the first data package and, in response, has acknowledged such receipt by commanding the IVU to revert to a downlink mode of operation.

It should be remembered that the exemplary subdivisions of link ASIC, link controller, and SC controller do not imply a particular implementation level of integration. The separations are instead rather arbitrary and based mostly upon convenience in creating a demonstration embodiment using preexisting technology of Amtech and DigiCash to the extent possible.

During the downlink mode, a second data package is received from the RCS and stored at suitably addressed frames of RAM 500 from which the downlink data may be passed on to the smart card controller 312 and/or smart card 36 via the IVU link controller 310 for real time processing. The smart card 36 and/or smart card controller 312 then generates appropriate return data packages that are appropriately formatted in frame RAM 500 via link controller 310 for subsequent transmission back to the RCS in an uplink mode of operation.

Figure 4:
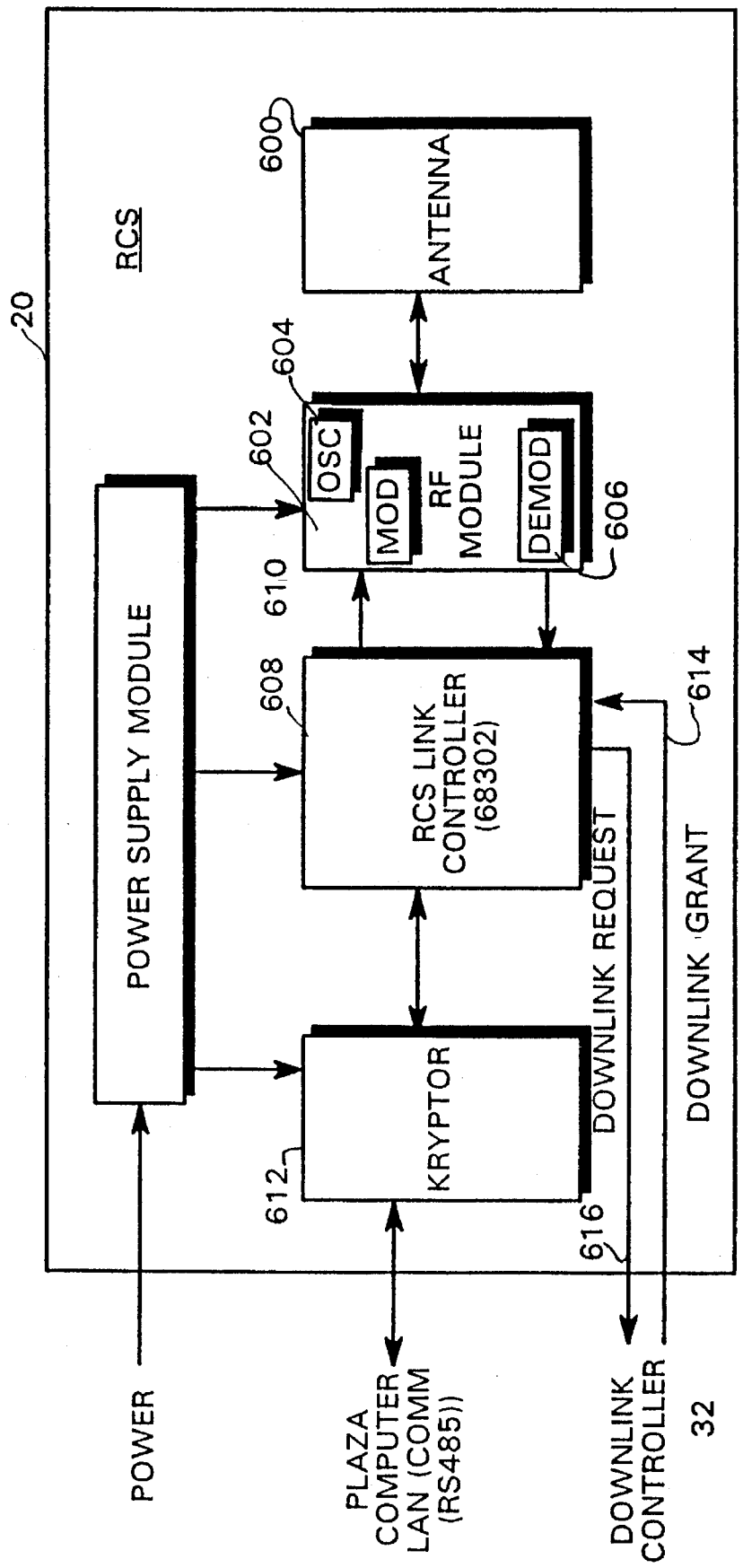
FIG. 4 is a block diagram of an exemplary roadside collection station (RCS) used in the embodiment of FIG. 1.

A block diagram of the RCS 20 is depicted at FIG. 4. As with the IVU, antenna 600 may be of any suitable conventional design for a short range microwave communication link. Although more space may be available at the RCS to accommodate bulkier antenna designs (e.g., a Yagi antenna), in the presently preferred exemplary embodiment, antenna 600 is a multi-patch microstrip antenna array having a beam radiation pattern gain of about 10 dB aimed downwardly and into the expected oncoming vehicular traffic. The RCS communication footprint may typically encompass only a few meters of vehicle travel (e.g. typically 2 or 3 meters, perhaps 4 or 6 meters) along a given highway lane—thus providing only a few milliseconds for a completed toll transaction at higher expected highway speeds (e.g., 300 Km/hr on German autobahns). The rf module 602 may be of conventional design and in accordance with the above-cited prior issued patents for this type of short range microwave bi-directional communication link. For example, it will include an rf oscillator 604 for generating the necessary CW microwave power that must be provided via antenna 600 to enable modulated backscatter uplink data transmission from the IVU. Such backscatter is conventionally monitored and demodulated at 606 so as to provide uplink data to the RCS link controller microprocessor 608 (e.g., a Motorola® 685302). Similarly, a suitable rf modular 610 is included in the rf module 602 to accept downlink data from the RCS link controller 608 and to suitably modulate the output of oscillator 604 so as to effect downlink data communications. As will also be appreciated, the RCS link controller 608 will control the rf module 602 so as to generate the requisite unique (i.e., "primitive") rf on-off signalling patterns as might be required to switch the IVU between uplink and downlink modes of operation.

The RCS link controller 608 may be a suitable microcomputer (e.g., the Motorola® 68302) capable of high speed serial data communication with conventional cryptographic data processing circuits 612. The Kryptor (a high speed RAS/DES encryption device) may typically include a suitable: digital signal processor (DSP), UART and DES chip. For example, the data processing circuits 612 may comprise high speed (e.g., 1536 Kbaud) data processing circuits capable of performing the requisite public key cryptosystem functions such as are available as a "Kryptor: i-1200 (MPR-6000)" from Crypto AG in Zug, Switzerland. As indicated, the Kryptor 612 is also connected as a node on the plaza computer LAN so that cross-lane read-in data not recognized by a particular RCS 20 may be passed to the higher level LAN where it may be verified offline, after receiving all necessary frames. Furthermore, the downlink timing controller input is connected to the RCS link controller 608 as depicted in FIG. 4. Accordingly, whenever the RCS link controller 608 wishes to transmit downlink data, unless there is already present a downlink grant on line 614, a downlink request must be generated on line 616 to the downlink controller 32. Only when a downlink grant is thereafter provided by the downlink controller on line 614 may the RCS link controller 608 actually effectuate a downlink data communication session.

An exemplary uplink control process (e.g., to be implemented via firmware or software control of the RCS link controller 608) is depicted in the block diagram of FIG. 4A. In the exemplary embodiment, uplink control is achieved on an interrupt basis. Accordingly, it starts when an interrupt is detected at block 700. Upon such interrupt, the incoming uplink frame is mad and processed at 702. A pre-defined check sum is tested at 704 to ensure that the received check sum agrees with the locally calculated check sum. If not, then control is passed back to wait for yet another interrupt at 700 when yet a subsequent uplink data frame has been received. If the check sums do agree, then control is passed to block 706 where a check is made on the transaction identification included within the incoming uplink frame of data. For example, a plurality (e.g. 8) of the most recent incoming transaction identification data may be maintained in a rotating buffer for comparison against incoming transaction identification data. If the detected transaction identification is detected as being unique at 706, then it is entered into the buffers (which are suitably rotated so as simultaneously to chop off the oldest prior detected transaction ID and accept this new transaction ID at block 708 and 710). If the transaction ID of the incoming uplink frame of data is not unique, then the frame data is further tested at block 712 to see if the incoming uplink frame is a new frame of received data. If not, then the status (e.g., Ack or Nack) of the incoming frame is checked at 714 (e.g. again against a suitable rotating buffer) if not, then the handshake counter is incremented at 716 and control is returned to the wait for interrupt at 700. Otherwise, the new status of the incoming frame is stored at 718, the handshake counter is set back to a beginning content of one at 720 and the incoming frame of new data is then reported to the kryptor circuits for further processing at 722. If the frame is a negative acknowledgment (i.e. a "Nack") to a pending downlink request, then a downlink message for another retry may be suitably generated and sent at 724 before control is passed back to wait for another interrupt at 700. As may be appreciated, the real time processing at blocks 700 and 702 may be most conveniently carded out in "hardware" implementation while the remaining blocks in FIG. 4A may typically be carded out in firmware/software by a suitable microcomputer.

The general flows of data during the preparatory "precommit" phase and three actual communication phases involved in a complete toll transaction for the exemplary embodiment are graphically depicted at FIG. 5. For example, data representing the version of a suitable cryptographic key, the type of smart card, the vehicle classification, index for a cryptographically secured electronic money check and the electronic money check dc defining the anonymous untraceable electronic :money check are all preloaded into appropriate frames of the link ASIC RAM 500 within the IVU prior to any actual data communication with an RCS. Such data is generated either from the smart card or smart card controller and, as indicated by arrow 800 is passed onwards to the link ASIC where it is stored in readiness for the next toll transaction.

Whenever the presence of the requisite CW microwave field of an RCS is detected, then the IVU is fully tamed "on" and enters the first or "commit" phase of uplink data communication to the RCS. Prior to this time, the link controller 310 configures the link ASIC 308 to repetitively scroll and transmit in the uplink direction a portion of the electronic check data dc (together with the other previously accumulated data already residing at the link ASIC due to the precommit phase of operation at some prior time). As indicated by further small uplink-directed arrows in FIG. 5, this repetitively transmitted uplink data is directly passed within the RCS to the Kryptor (a high speed RAS/DES encryption device) circuits via the RCS link controller. In turn, as soon as this data is successfully passed to the Kryptor (a high speed RAS/DES encryption device) the Kryptor (a high speed RAS/DES encryption device) computes return data and passes it back in the downlink direction during a subsequent "challenge" phase of data communication as depicted by small downlink-directed arrows in FIG. 5.

A so-called "spoof-proof" data may be generated as a shortened encrypted version of some or all of the commit data so as to permit the IVU to authenticate the RCS before any actual toll charges are debited from the smart card. For example, since the spoof-proof data is generated based upon uplink "commit" data, and since both the smart card inserted into the IVU and the RCS may share a traditional secret key for this purpose (e.g. in addition to cryptosystem components that may be utilized for the electronic money transfer itself), a similar shortened encryption may already have been computed during the precommit phase and stored at the link controller. There it is ready for immediate comparison with the downlink spoof-proof data generated by the RCS kryptor circuits and transmitted during the "challenge" phase. As depicted, the "challenge" downlink data would also include digits 0[ ] representing, among other things, the amount of the computed toll charges, the charge station identity, the time of the transaction, etc. As indicated by further little downlink-directed arrows, this "challenge" data is passed to the smart card via the smart card controller and link ASIC in the IVU.

Following authentication of the RCS by processing of the downlink "challenge" data, the IVU then generates the remainder of the transaction data via the smart card (e.g. the necessary columns of wrapped data W and a suitable cryptographic opener R) which is transmitted together with the rest of the electronic check data dc to the RCS kryptor where the transaction is completed. As will be appreciated, the data generated by the smart card at this time includes cryptographically secured verification data confirming that an actual successfully completed debit to a valid smart card has already occurred such that the RCS Kryptor (a high speed RAS/DES encryption device) may with confidence know that the requisite toll has been fully paid.

FIG. 5A is similar to FIG. 5, but includes reference to specific frame numbers of the frame RAM 500 that might be wed for a relatively simple frame protocol (e.g. such as might be possible with an open toll road system where it is not necessary to transmit highway entry point data to the RCS). Here, for example, frames 1 and 4–7 are preformatted and stored in RAM 500 during the precommit phase. Only frame 1 is actually transmitted during the commit phase in the uplink direction. The contents of the command frame and frame 0 are then returned during the "challenge" phase in the downlink direction while the contents of frames 8–14 are passed in the uplink direction during the payment/opener phase of communication. By contrast, in the more complex frame protocol of FIG. 5B, the commit phase and other phases involve the transmission of larger numbers of data frames (e.g. so as to identify the highway entry point for toll calculation).

Both described frame wages are when wing a 512-bit RSA cryptosystem. This can be extended up to 768 bits for higher security. Also, the number of challenge digits can be increased, from 10×4 bits to 16×4 bits. This will cause longer payment data W. If both extensions are done, frames 15–22 would also be wed.

As mentioned, uplink transmission from an IVU to an RCS occurs by a process called backscatter modulation. The RCS transmits a continuous wave (CW) microwave carrier output via its antenna. The IVU antenna reflects a small portion of this energy, some of which is received by the RCS antenna. Additionally, the IVU is capable of switching its antenna so that it may alternatively reflect the incident microwave energy with high efficiency or with low efficiency. The RCS receiver is capable of detecting the different reflected signal levels from an IVU within its read range. An IVU is designed to modulate the antenna with a data pattern which can be sensed and decoded by the RCS. The exemplary protocol has been defined such that all uplink data is grouped into distinct frames of 128-bits each. The IVU link ASIC memory is partitioned into 32 frames of 128-bits each for a total of 4096-bits. Each uplink frame of data read from the IVU in an exemplary embodiment may consist of the following fields:

TABLE 1

| Uplink | | | | | |
|---|---|---|---|---|---|
| Frame 1 Init | | Frame 0 Nack | | Frame N Data | |
| Name | Bits | Name | Bits | Name | Bits |
| Txid | 64 | Fack | 32 | Udata | 104 |
| Udata | 48 | Ferr | 32 | | |
| | | Udata | 40 | | |
| | | Lane | 4 | Lane | 4 |
| | | Seq | 4 | Seq | 4 |
| Cksl | 1 | Cksl | 1 | Cksl | 1 |
| Frm0 | 1 | Frm0 | 1 | Frm0 | 1 |
| Val0 | 1 | Val0 | 1 | Val1 | 1 |
| FrNo | 5 | FrNo | 5 | FrNo | 5 |
| Cksh | 3 | Cksh | 3 | Cksh | 3 |
| Lobat | 1 | Lobat | 1 | Val | 1 |
| Sens | 1 | Sens | 1 | Sens | 1 |
| Fm | 3 | Fm | 3 | Fm | 3 |
| Total | 128 | Total | 128 | Total | 128 |

Where Txid = Transaction identification (actually block 0 of the electronic check dc)
Udata = User data
Cksl = Cheek sum low
Frm0 = Frame 0 indicator
Val0 = Validity status (e.g., Ack or Nack)
FrNo = Frame number (0-31)
Cksh = Check sum h TABLE 1-continued

| Uplink | | | | | |
|---|---|---|---|---|---|
| Frame 1 Init | | Frame 0 Nack | | Frame N Data | |
| Name | Bits | Name | Bits | Name | Bits |

Lobat = Low battery alarm
Sens = Sensitivity (Received RF level)
Fm = Frame marker
Fack = Frame acknowledgement bit mask
Ferr = Frame error bit mask
Lane = Highway lane number (provided by RCS)
Seq = Rotating transaction sequence number (provided by RCS)

Uplink frame numbers may be utilized and assigned as shown below:

TABLE 2

| Frame | 0 | 1 | 2 | 3 |
|---|---|---|---|---|
| 0 | Nack | Commit | Commit (reserved) | Commit (reserved) |
| 4 | Payment (sig) | Payment (sig) | Payment (sig) | Payment (sig) |
| 8 | Payment (sig/chk) | Payment (chk) | Payment (chk) | Payment (chk) |
| 12 | Payment (chk) | Payment (chk) | Payment (chk/opener) | Payment (reserved) |
| 16 | Payment (reserved) | Payment (reserved) | Payment (reserved) | Payment (reserved) |
| 20 | Payment (reserved0 | Payment (reserved) | — | — |
| 24 | — | — | — | — |
| 28 | — | — | — | — |

The 5-bit FrNo field identifies the :frame and provides for the selection of 32 unique frames which provides an upper IVU link ASIC memory limit of 4096-bits.

The 1-bit Dack field indicates whether the frame is an acknowledgment of a previously received downlink message.

The Udata fields are generally available for unrestricted use by the application.

The 64-bit Txid field is part of the unique electronic check data created by the IVU prior to each transaction.

The cks fields permit the RCS to reject any received frame which does not contain a valid checksum. It is the responsibility of the IVU to calculate and encode the checksum into each uplink data frame transmitted to the RCS. The cks field is computed on a predetermined set of bits in every uplink frame mad by the RCS. Frames received by the, RCS without the correct checksums are ignored (i.e., rejected).

The 1-bit val/lobat field is val in frames 1 through 31 and lobat in frame 0. Val may be efficiently set or cleared by the IVU. This feature may be used to efficiently validate or invalidate selected regions of IVU link ASIC memory without having to rewrite all of the data. The Lobat field is available in frame 0 only and indicates the status of the IVU link ASIC battery (i.e., supply voltage). A Lobat equal to zero indicates that the IVU link ASIC is powered by the primary battery and all functions are active whereas a Lobat equal to one indicates that the backup battery is active and the IVU link ASIC is operating with reduced functionality.

The 1-bit sense field is reserved. The IVU link ASIC sets the sensitivity bit TRUE whenever the detected microwave level exceeds a preset threshold. This feature can optionally be used by the RCS to determine when a downlink transaction may be reliably initiated.

Fack is for indicating correctly received frames, and is coded the same way.

The 3-bit fm field is also reserved. These bits are encoded into each frame by the IVU link ASIC and used by the RCS hardware to determine where on frame ends and the next frame begins. As previously indicated, all data is transferred in integral multiples of frames.

The 32-bit Ferr field is used by the IVU, as part of a negative acknowledgment (Nack) message, to inform the RCS which frames were received in error. Each bit which is set to a one within Ferr indicates the frame number of a frame received in error. For example, a value of 80000002 would indicate that frames 1 and 31 were received in error.

The 4-bit Seq is assigned by the Kryptor (a high speed RAS/DES encryption device) as a transaction sequence number and is incremented by one for each new Seq. The assigned Txseq is transmitted to the IVU as part of the downlink message. Once the IVU receives the downlink message correctly, the Seq value is encoded into all subsequent uplink frames i.e., Ack and Data) in order to conserve Udata bks.

The 4-bit Lane number is assigned by the Kryptor(a high speed RSA/DES encryption device) according to its assigned 5 lane number is transmitted to the IVU as part of the downlink message. Once the IVU receives the downlink message correctly, the Lane value is encoded into all subsequent uplink data frames in order to resolve cross lane readings. This is especially important when one considers that the Seq is only 4-bits long and, therefore, uniqueness would not, necessarily, be maintained across lanes. Of come the number of bits used by the Txseq and lane number does not need to be 4. This is simply a convenient and reasonable choice.

The RCS transmits downlink data to the IVU by a process called on-off key. The continuous wave microwave output of the RCS is switched on and off according to the data to be transmitted to the IVU. The IVU is able to detect and decode these transitions in received microwave energy at its antenna. Data sent in the direction of RCS to IVU is defined as the downlink direction. The data rate for sending a continuous sequence of one-bits is 384 KBaud while the data rate for sending a continuous sequence of zero-bits is 192 KBaud. Thus, the worst case data rate for downlink data transfer is 192 KBaud.

In order to initiate a downlink transaction, the RCS sends a listen command primitive to the IVU. The listen command primitive is special, insofar as the IVU is able to detect this command even while simultaneously transmitting data to the RCS. Once the listen command primitive has been properly received, the IVU stops transmitting in anticipation of receiving data. The RCS may then complete the downlink transaction.

A downlink transaction thus consists of a command primitive optionally followed by a command message. A command message consists of a command frame optionally followed by one more data frames. The IVU automatically switches into transmit mode following the receipt of a valid command message over the microwave link. This feature is important since an IVU which remains in the listen mode cannot be detected by the RCS. A downlink transaction can be performed at several levels as shown below:

a. <CmdPri ><dl ><CmdFrame> b. <CmdPri ><dl ><CmdFram ><DataFrl . . . DataFrN> where

<CmdPrim>=Command primitive
<dyl>=Delay
<CmdFrame>=Command frame
<DataFrN>=Data frame number N The type a) message can perform more complex operations such as the invalidation of selected frames. The type b) message is required to write actual data into the IVU link ASIC memory.

Command primitives, command frames, and data frames are described below. A command primitive is a special command used to alter the IVU operating mode or prepare the IVU to receive a subsequent command message. All command primitives consist of a command signal followed by a sequence of 16 data bits followed by a frame marker. The command signal and frame marker do not conform to the format defined by binary data. The command signal temporarily forces the IVU into the listen mode in anticipation of receiving the binary data which follows shortly thereafter. It is necessary for the IVU to enter the listen mode in order to ensure the reliable transmission of binary data to the IVU.

During the 3 phase transaction, 2 commands may be sent by the RCS link controller to the IVU. After successful reception of the commit, the RCS will issue the WRITE command to write the challenge. After receiving some of the payment data, the RCS may issue a SELECT command to select a different scroll range. It may also tell the IVU to be silent after a successful transaction by issuing a SELECT command with the <fsel> field set to 00000000. The IVU will not "wake up" until it has left the microwave field and entered a new microwave field.

After sending a command signal, there may be a short command primitive, and then a command frame and data frames. The command primitives are chosen in such a way that IVU's receiving a command primitive not meant for them can go back to scrolling without waiting for the command frame. This results in the following downlink scenario for a write command:

| Field | Size | Description |
|---|---|---|
| | | Command Primitive |
| Spoof 1 | 8 bits | First byte of spoof |
| Magic | 8 bits | First byte of spoof xorred 0 x 55 |
| | | Command Frame |
| Spoof 2 | 8 bits | Second byte of spoof |
| lane/seq | 8 bits | Lane/sequence number |
| res | 3 bits | reserved |
| fcnt | 5 bits | Frame count of frames to come |
| omd | 8 bits | Command code |
| crc | 32 bits | 32 bit crc (including 64 bits spoolf not sent) |
| This also results in the following for a select command. | | |
| | | Command Primitive |
| lane/seq | 8 bits | Lane/sequence number |
| magic | 8 bits | Lane/sequence number xorred 0 x AA |
| | | Command Frame |
| fsel | 32 bits | fsel |
| crc | 32 bits | 32 bit crc (including 64 bits spoof not sent) |

Since selection of frame 0 makes no sense (it is a Nack frame), the last bit of the fsel field actually helps distinguish between SELECT and WRITE commands. Therefore, only odd command codes will be allowed.

As stated previously, a command message always begins with a command frame. A command frame may be divided into the following fields:

TABLE 3

Downlink

Primitive/Command

| Downlink Efselect | | | | Data | |
|---|---|---|---|---|---|
| Command | Bits | Name | Bits | Name | Bits |
| Lane seq | 8 | Spoof1 | 8 | Udata | 88 |
| Magic | 8 | Magic | 8 | | |
| fsel | 32 | Spoof2 | 8 | | |
| Crc | 32 | Lane | 4 | | |
| | | Seq | 4 | | |
| | | ClrFack | 1 | | |
| | | Res | 2 | | |
| | | Fcnt | 5 | Res | 3 |
| | | Cmd | 8 | FrNo | 5 |
| | | Crc | 32 | Crc | 32 |
| | | Fm | NA | Fm | NA |
| Total | 16/64 | Total | 16/64 | Total | 128 |

ClrFack=1 means clear Fack bit mask after every downlink command

The command code, <Cmd> provides the mechanism to command the IVU as required. Initially, a single command code shall be required which will cause data to be written into the selected IVU link ASIC memory. Other command codes shall be reserved for future unspecified functions.

The <magic> field is the exclusive orred value of the first byte of the command primitive with a constant. If the constnt is 55 (hexadecimal), it indicates the first byte should be interpreted as lane/sequence. If the constant is AA (hexadecimal), the first byte should be integrated as the first byte of the spoof.

The 32-bit crc is used by the IVU to verify the validity of all frames including the command frame. Command frames having an incorrect crc are ignored. The fm field is reed by the IVU to identify the end of command and data frames. Both the spoof fields Spoof 1 and Spoof 2 and crc are used to ensure that a downlink me;sage is accepted by the single IVU for which it is intended.

As previously stated, command messages may optionally include one or more downlink data frame. Downlink data frames include data to be written to IVU link ASIC memory. Each downlink data frame is divided into the fields as shown above.

The FrNo field is identical to the corresponding field within uplink frames. The IVU uses the crc to verify each frame received. This technique enables the IVU to detect errors and inform the interrogator with the Nack frame which frames were received in error. The fm field is appended to the end of each frame, but is exclusive of the 128-bit listed.

FrameN=Frame other than frame 0

Etxid=A 16-bit encrypted portion of Txid

Frame 0 always used as a negative acknowledgement.

The IVU link ASIC has a memory capacity of 4096-bits and is capable of bi-directional communications via an microwave link. The wire link feature is not implemented in firmware since it is not required for road pricing applications. The microwave link operates at a worst case data rate of 192 KBaud. The IVU transmits uplink messages to the RCS by scrolling through selected frames of data from IVU link ASIC memory. In order to satisfy applications having different levels of performance and data, the number of frames to be scrolled from IVU link ASIC memory can be varied. Frames are continuously scrolled in the sense that the selected frames scroll repetitively. This technique allows for reliable uplink data transmissions under marginal microwave link conditions. When the IVU leaves a microwave field for a preset time interval, it automatically reverts to the commit data message. Thus, an RCS is able to efficiently read out the commit data messages when an IVU first enters the read range. The commit data messages are automatically reloaded into the IVU ASIC link memory following each transaction over the microwave link. The RCS may command the IVU to scroll through selected frames of IVU link ASIC memory. The IVU will continue to scroll the selected frames until it leaves the microwave field or receives another command.

The RCS is capable of bi-directional communications with the IVU at a worst case data rate of 192 KBaud. The RCS link controller supports a serial port which allows received uplink IVU data to be transmitted to the Kryptor (a high speed RSA/DES encryption device). Likewise, a Kryptor (a high speed RSA/DES encryption device) may request the RCS to transmit data downlink to the IVU. The RCS is designed to read uplink data in distinct frames from the IVU. It is possible that individual frames from the same IVU may be read in either a continuous or discontinuous fashion depending upon the quality of the microwave link. The RCS is designed in such a way that it will receive data from the IVU offering the strongest signal and reject data from IVU's offering weaker signals. In the event that two or more IVU's offer the same signal, neither IVU will be read. It is assumed that the antenna communication zone will generally be small compared to the typical IVU-to-IVU spacing. This situation will minimize the probability of two or more IVU's offering the same signal to the RCS. In order to allow frames to be reassembled according to the IVU from which they originate, a 64-bit Txid is encoded into each uplink Init and Nack frame. This feature is important since multiple IVU's may simultaneously be located within the read range of a given RCS. The Txid is created by the ICU for each new transaction. Once a new Txid is received by the Kryptor (a high speed RSA/DES encryption device), a 4-bit Lane number (Lane) and 4-bit transaction sequence (Txsec) number is assigned to that transaction. The Lane number corresponds to the value given to each Kryptor (a high speed RSA/DES encryption device) by the plaza computer. The Txseq is a 4-bit number which is sequentially assigned by the Kryptor (a high speed RSA/DES encryption device) for each new transaction. These values are encoded into the downlink message sent to the ICU as part of the challenge message. Once the downlink message is correctly received by the IVU, the Lane and Txseq values shall be encoded into each Ack and Data frame. These values serve the same purpose as the Txid, but with far fewer bits (i.e., 8 vs 64-bits). Also, uplink frames may be read by more than one RCS, in which case the lane number may be used by the plaza computer to resolve conflicts (e.g., cross lane readings).

The RCS is capable of transmitting data downlink to the IVU. The command message include; a 16-bit encrypted version of Txid (Etxid) in order to ensure that only the IVU for which the message is received, accepts the data. Additionally, the crc encoded into the command message is computed over the full 64-bit Txid in addition to the command frame itself to further ensure that only the correct. IVU accepts the message. Whenever an RCS wishes to transmit a downlink message, it asserts a downlink request signal and waits for a proper downlink grant signal to be asserted.

The RCS program code is preferably implemented in both read only memory (ROM) and electrically erasable read only memory (EEPROM). The EEPROM memory provides for convenient upgrades in the field over the serial communication port. The RCS stores all configuration parameters in both volatile and non-volatile memory. The storage in volatile memory provides for fast access during real time, operation of the RCS. The storage in non-volatile memory provides for the long term reliability and security of the RCS configuration. The configuration EEPROM is rated for 100,000 write cycles.

The RCS periodically restores the EEPROM configuration parameters to volatile memory in order to guard against the possibility of electrical noise or other interference corrupting the less secure volatile memory.

In order to ensure that uplink frames of data received by the RCS can be correctly associated with the correct IVU, the following is preferable:

1. The Init frame includes a 64-bit transaction identification (Txid) field which is assigned by the IVU and is unique for the duration of a transaction.
2. All uplink data frames and the Ack frame contain an 8-bit Txseq/Lane field which is assigned by the RCS and which is uniquely associated with both the Txid and lane number of the roadside charging station which previously wrote to the IVU.

The RCS preferably functions as follows with respect to uplink data reception:

1. Verify correct checksum of all received uplink frames,
2. Report all verified and unique IVU data frames to the Kryptor (a high speed RSA/DES encryption device) immediately.
3. Maintain shams of the last n IVU's in an uplink IVU buffer where n is a parameter to be optimized for the application and,
4. Filter redundant uplink frame data and maintain diagnostic handshake counts.

The uplink data transfer operates according to the flow chart shown in FIG. 4A. As can be seen, uplink data frames are first checked to be sure that the encoded 4-bit cks is correct. Frames received in error are simply ignored. Frames received without error are then checked for a unique 64-bit Txid or in the case of Ack/data frames the corresponding 8-bit Txseq/Lane value. The RCS maintains n uplink IVU buffers where n is optimized for the application. Each uplink IVU buffer includes the Txid and provide storage for thirty two 128-bit values corresponding to each of the individual IVU frames. The first byte of the word corresponds to the Txseq/Lane fields. The second byte corresponds to the uplink frame status byte. The uplink frame status byte corresponds to the first byte of an uplink frame and is comprised of FrNo and Va10 (for frame 0 only). The third byte of the value contains the handshake count (i.e., number of redundant readings for the frame). Assuming that a frame having a unique Txid is received, the RCS rotates the uplink IVU buffer pointers such that the new IVU data buffer overwrites the oldest IVU data buffer. The Txid and status are then stored in the buffer, the handshake count for the corresponding frame is set to one, and the entire frame is reported to the Kryptor (a high speed RSA/DES encryption device). It should be noted that only the Txid and status byte need be stored by the RCS once the entire frame is reported to the Kryptor (a high speed RSA/DES encryption device). Assuming that a new frame is received with a non-unique Txid, the frame status byte is stored, the corresponding frame handshake count is set to one, and the entire frame is reported. Assuming that a non-unique Txid (or Txseq/lane number) and previously received frame with unique status is received, the new status is saved, the corresponding handshake count (HS) is set to one, and the frame is reported. Assuming that a non-unique Txid and previously received frame with non-unique status is received the corresponding handshake count is incremented and the frame is otherwise ignored. Each time a frame is reported to the Kryptor (a high speed RSA/DES encryption device) it is checked to see if the frame is a Nack frame corresponding to a pending downlink message request. If so, a downlink message retry is initiated once a downlink grant has been received. It should be noted that the frame status for a given IVU could change during the course of a single transaction. These frames are considered unique and shall be reported to the Kryptor (a high speed RSA/DES encryption device) immediately. It is the responsibility of the IVU to ensure that Udata in IVU link ASIC memory is not changed without a corresponding change to either the Txid or status byte. These constraints provide for an efficient uniqueness determination within the RCS firmware based upon the first 9 bytes of each frame for Init and Nack frames and fast 2 bytes of each frame for Ack and data frames.

The RCS preferably functions as follows with respect to downlink data transmission:

1. Receive downlink message requests from Kryptor, (a high speed RSA/DES encryption device)
2. Transmit downlink messages to the IVU during downlink grant intervals, if enabled,
3. Verify response from IVU and automatically retry downlink transmissions as required,
4. Retransmit only those frames received in error by the IVU, and
5. Report result of downlink transaction to Kryptor (a high speed RSA/DES encryption device) if a failure occurs.

The process begins by the Kryptor (a high speed RSA/DES encryption device) sending a downlink message request to the RCS. The RCS responds by storing the request in the downlink message buffer, setting a time-out, and transmitting a command primitive followed by a command message to the IVU during downlink grant intervals. The RCS continually reserves the message and attempts to verify that all data frames have been successfully received until a preset maximum retry count has been exceeded or the downlink message request buffer has been overwritten by subsequent downlink message requests whichever happens first. The maxima number of downlink message attempts may be set by the Kryptor (a high speed RSA/DES encryption device). If the data is successfully verified, the RCS may transmit the corresponding Ack/data frames to the Kryptor (a high speed RSA/DES encryption device). If the maximum retry count is exceeded prior to verification of the downlink message, the RCS sends a failed downlink status message to the Kryptor (a high speed RSA/DES encryption device).

The RCS issues a downlink message to the IVU, sets a time-out, and waits for a response. The downlink message is buffered internally and remains pending until one of the following occurs:

1. The downlink message maximum retry count is exceeded, or
2. The pending downlink message request is overwritten by a subsequent request, or
3. An Ack/Data message is received.

If no response is received from the IVU within a preset time interval, the RCS assumes that the message was not received and retransmits the message (i.e., time-out expired).

The IVU will respond with either a Nack message or a change in its scroll frames as implicit acknowledgement upon receiving a downlink message. If the response is a Nack, then the message was received with errors and the RCS will retransmit the message with only those data frames designated by the Efsel field as having been received in error. This process continues until the entire message is received without error, the maximum retry count has been exceeded or the downlink message is overwritten by a subsequent request. In the case of the retry count being exceeded, the interrogator will issue a failed downlink status message to the Kryptor (a high speed RSA/DES encryption device). If an (implicit) acknowledgement is received, then the previous downlink message was received without error. In this case, the RCS will issue a newly received frame to the Kryptor as a matter of course.

Given the general requirement to complete and verify a smart card (SC)-based transaction at vehicles speeds up to 160 km/h (or even up to 300 km/h), it is preferable to optimize the overall RCS transaction in every way possible. A summary of a type road pricing transaction is shown below. The numbers in parenthesis represent the number of frames which would be required for other more demanding road pricing scenarios.

During the precommit phase, the IVU provides a new 64-bit transaction identification code (Txid) for each transaction. All frames associated with the commit phase are preloaded into the IVU link ASIC memory as required. Also, the scroll RAM is initialized to scroll out the required frame(s) for hue commit phase. The number of frames will depend upon the application. All of these operations are assumed to occur prior to the IVU entering hue microwave communication zone, therefore, time is non-critical.

During the commit phase, as a vehicle approaches, the IVU automatically transmits and the RCS automatically receives all uplink commit frames and reports same to the Kryptor (a high speed RSA/DES encryption device). It is assumed that the scrolled frames correspond to all frames required for the commit phase (i.e., 1 to 3 frames). Therefore, this phase does not require any action on the part of the IVU. The interrogator and Kryptor (a high speed RSA/DES encryption device) should be capable of handling several IVU's in parallel given the software linkage between frames (i.e., Txid). Of course, it is also possible that the toll plaza will employ an approach microwave beacon communication to ensure IVU compatibility with the upcoming RCS toll plaza—e.g., thus to provide ample notice for a drive to pull off the road before passing the toll plaza (or to go to an alternate manual toll both) if not compatible.

During a challenge phase, once all commit data has been received, the Kryptor (a high speed RSA/DES encryption device) computes the challenge message and issues the corresponding downlink message request to the RCS. The RCS then transmits the challenge message to the IVU. As described elsewhere, the RCS performs the necessary retries as required until the message is verified. The IVU issues a Nack frame if incorrect challenge data is received in which case the RCS immediately resends the challenge message. Once the IVU receives a correct challenge message, it will transmit data frames (i.e., payment data). This message informs the RCS that correct challenge data (i.e., correct crc) was received and there is no need to resend The challenge message. The RCS then reports the payment frames to the Kryptor (a high speed RSA/DES encryption device) as received. For several reasons, the RCS maintains downlink message requests for n IVU's. The value of n may be optimized for the application. Downlink message requests are maintained within the RCS until the downlink message buffer overflows in which case the oldest request will be overwritten. The multiple buffering of downlink message requests permits:

1. interaction with multiple IVU's simultaneously within the read/write range of the RCS. As a rule, the RCS will always attempt to write to the IVU from which it received data most recently and 2. retry of downlink messages whenever the RCS receives a Nack message.

During the payment phase, the IVU issues the payment frames following successful receipt of the challenge frame. The payment frames are transmitted to the Kryptor (a high speed RSA/DES encryption device) by the RCS as received. The Kryptor uses the payment data to confirm that the SC has been correctly debited. Since there may be numerous payment: frames, the RCS shall be required to filter redundant frames depending, of course, upon the quality of the microwave link and possible interference from nearby IVU's and RCS's. Since the payment frames are linked in soft-ware through the Txseq/Lane fields, it is possible for the RCS to receive frames in discontinuous intervals and still allow for reassembly of the complete payment message by the Kryptor (a high speed RSA/DES encryption device). As with the commit phase, it should be possible for the RCS and Kryptor (a high speed RSA/DES encryption device) to handle several IVU's in parallel given the software linkage between frames. The RCS incorporates a high speed, full duplex synchronous serial interface with the Kryptor operating at a data rate of 1.536 MBaud. This data rate is based upon the existing 68302 microprocessor clock rate of 15.36 MHz and limitations as defined in Appendix A of the *Motorola MC68302 User's Manual*.

The RCS high performance synchronous serial communication interface is provided in order to communicate to the real time Kryptor (a high speed RSA/DES encryption device) module. Messages may be initiated by either the Kryptor (a high speed RSA/DES encryption device) or by the RCS link controller. The protocol preferably supports the transfer of 8-bit binary data in order to achieve high bandwidth and is of the error correcting type in order to ensure reliable operation. The RCS link controller preferably implements a priority scheme such that messages received at the serial port shall be saved pending completion of ongoing microwave communication tasks. That is to say, that microwave tasks have priority over serial communication tasks, but character input are handled in parallel with microwave task processing. The Kryptor (a high speed RSA/DES encryption device) waits for completion of one request prior to issuing a second request. Generally, the RCS link controller issues messages to the Kryptor (a high speed RSA/DES encryption device) in the order in which they are processed.

The Kryptor (a high speed RSA/DES encryption device) may issue a variety, of requests to the link controller. Requests may include an information field which is comprised of a command code and optional parameters associated with the command code. The format for the information field is as follows:

<Cm ><Data> where,

<Cmd>=Command code (00-FF Hex)

<Data>=Parameter data of variable length

One possible set of command codes is summarized below:

| <Codes> | Description |
| --- | --- |
| 00 | Perform software reset of RCS |
| 01 | Request RCS firmware version no |
| 02 | Set configuration to default |
| 03 | Set configuration and mode |
| 04 | Request configuration |
| 05 | Set date and time |
| 06 | Request date and time |
| 08 | Send downlink message to IVU |
| 09 | downlink program code |

The RCS link controller may also issue messages to the Kryptor (a high speed RSA/DES encryption device). Messages may typically include an information field which is comprises of a command code and optional data associated with the command code. One possible format for the information field is as follows:

<Cm ><Data> where

<Cmd>=Command code (00-FF Hex)
<Data>=Parameter data of variable length Currently defined controller to Kryptor messages are listed below:

| Code | Description |
| --- | --- |
| 00 | Transmit data and time |
| 01 | Transmit configuration |
| 02 | Transmit diagnostics |
| 03 | Transmit sign on message "RCS 1.0 Ver y.yyx(c) 1993" (y is 0–9 and x is A–F) |

Note: This message is issued upon power up or following the reset request. The initial firmware release of the link controller is Ver 1.00A. If an encoded and calculated memory checksum disagree then the version will be, reported as Ver 0.zzx where zz is an error code as defined below. CoName is the name of company holding copyright.

| zz | Description |
| --- | --- |
| 01 | Bad program PROM |
| 02 | Bad program EEPROM |
| 04 | Bad configuration EEPROM |

In the case of zz=01, the RCS must be returned to the factory for repair. In the case of zz=02, new firmware must be downloaded and the RCS will automatically switch to the Download Mode in anticipation of the download. In the case of zz=04, the RCS will automatically reset all configuration parameter to the factory default state and, therefore, the user must reconfigure the RCS as desired. Combination errors are also possible (e.g., bad program and confirmation EEPROM).

A presently preferred embodiment utilizes the following frame data assignments for the pre-commit phase and the following three data communication phases shown in FIG. 5.

The three data packages involved in the data communication packages for these phases are given in Tables 4 and 6:

TABLE 4

| | COMMIT message | | | | |
| --- | --- | --- | --- | --- | --- |
| Description | Frame numbers | No. of frames | Bits available | Bits utilized | % Utilization |
| key version vj | | | | 16 | |
| card type sl type | | | | 8 | |
| vehicle class sV | | | | 8 | |
| check index c | | | | 3 | |
| entry plaza Ep | | | | 5 | |
| block 0 dc (Txid) | | | | 64 | |
| byte 9 of dc | | | | 8 | |
| Total | 1 | 1 | 112 | 112 | 100.0 |

TABLE 5

| | CHALLENGE message | | | | |
| --- | --- | --- | --- | --- | --- |
| Description | Frame numbers | No. of frames | Bits available | Bits utilized | Utilization |
| spoof | | | | 16 | |
| seq | | | | 4 | |
| lane | | | | 4 | |
| Subtotal | command | 0.5 | 24 | 24 | 100.0 |
| digits o[ ] | | | | 40 | |
| station 1d sC | | | | 16 | |
| time | | | | 24 | |
| Total | 0 | 1 | 88 | 80 | 90.9 |

TABLE 6

| | PAYMENT message | | | | |
| --- | --- | --- | --- | --- | --- |
| Description | Frame numbers | No of frames | Bits available | Bits utilized | % Utilization |
| Rest of dc | 4–8 | 4 | | 440 | |
| Wrapped W | 8–13 | 6 | | 640 | |
| Opener R | 13 | 1 | | 64 | |
| Total | 4–13 | 11 | 1144 | 1144 | 100.0 |

Although though only one embodiment of this invention has been described in detail, those skilled in the art will recognize that many variations and modifications of this particular embodiment may be made while yet retaining one or more of the many novel features and advantages of this invention. For example, many of the IVU and/or RCS circuits could advantageously be simplified and/or further integrated in a commercialized embodiment of this invention. Accordingly, all such variations and modifications are intended to be included within the scope of the appended claims.

What is claimed is:

1. An in-vehicle unit for use in an automatic highway toll collection system, said in-vehicle unit comprising:

an rf antenna having a radiation pattern disposed in proximity to an associated vehicle for communicating with a roadside collection station while moving therepast;

rf circuits connected to said antenna for operating in either a first mode wherein a data uplink is established with a roadside collection station by modulating the reflectivity of said antenna or a second mode wherein a data downlink is established with a roadside collection station by demodulating received rf signals;

a smart card controller connected with a smart card; and a link controller connected to said rf circuits and to said smart card controller and including circuits for causing operation in said first mode to repetitively transmit first data to a roadside collection station and in said second mode to receive second data, based at least in part on said first data, whereupon operation is switched back to said first mode for transmission of third data based at least in part on said second data, said first and third data together collectively comprising an encrypted electronic money transfer.

2. An in-vehicle unit as in claim 1 wherein said smart card contains encrypted data representing monetary value, said smart card and smart card controller being connected to the link controller to provide (a) at least a portion of said first data as part of an encrypted data set representing a transfer of monetary value and (b) at least a portion of said third data based in part on said second data and the remainder of said encrypted data set representing a transfer of monetary value and representing a verified valid debit of a highway toll from the smart card.

3. An in-vehicle unit as in claim 1 wherein said second data includes an encryption of at least some of said first data and is utilized to authenticate the roadside collection station.

4. An in-vehicle unit as in claim 1 wherein said second data includes roadside collection station transaction sequence and roadside collection station lane number data.

5. An in-vehicle unit as in claim 1 wherein at least one of said second and third data includes plural frames of data, each frame including the same roadside collection station transaction sequence and roadside collection station lane number data.

6. An in-vehicle unit as in claim 1 wherein said smart card includes encrypted data representing pre-stored increments of money that are anonymous by failing to include any data capable of revealing person or vehicle identity to the roadside collection station.

7. An in-vehicle unit as in claim 6 wherein said pre-stored encrypted data representing increments of money are untraceable and are communicated from the in-vehicle unit to roadside collection station in an encrypted form that includes data required for its decryption.

8. An in-vehicle unit as in claim 1 wherein said first data includes unique transaction identification data.

9. An in-vehicle unit as in claim 8 wherein said unique transaction identification data includes a portion of toll payment data which otherwise would be transmitted as part of said third data.

10. An in-vehicle unit as in claim 1 wherein the smart card is adapted to provide with standard-speed smart card functions at a first rate when connected to standard smart card interfaces and high-speed smart card functions at a second rate higher than said first rate when connected to an in-vehicle unit.

11. An in-vehicle unit as in claim 1 wherein said in-vehicle unit includes means for optionally operating in a post-payment mode wherein at least one of said first and third data includes billing identity data for a subsequent billing of the toll.

12. An in-vehicle unit as in claim 1 wherein the data processing circuits of said in-vehicle unit include means for processing both closed highway tolls and open highway tolls.

13. An in-vehicle unit as in claim 1 including means for initiating operation in said first mode upon detecting in-vehicle unit proximity to an roadside collection station.

14. A roadside collection station for use in an automatic highway toll collection system, said roadside collection station comprising:

an rf antenna having a radiation pattern disposed in proximity to an associated highway lane at a toll collection zone and for communicating with an in-vehicle moving therepast;

rf circuits connected to said antenna for generating either a first mode wherein a CW rf signal enables an uplink communication of data from a passing in-vehicle unit via modulated reflections of the CW rf signal or a second mode wherein a modulated rf signal provides downlink communication of data to a passing in-vehicle unit; and a link controller connected to said rf circuits and including means for maintaining said rf circuits in said first mode until first data is successfully received from an in-vehicle unit and thereafter switching to said second mode until second data, based at least in part on said first data, is transmitted to the in-vehicle unit in question whereupon operation is switched back to said first mode for receipt of third data, based at least in part on said second data, said first and third data together collectively comprising an encrypted electronic money transfer.

15. A roadside collection station as in claim 14 further comprising:

cryptographic data processing circuits connected to receive uplink data from said controller and to provide downlink data to said controller, said cryptographic data processing circuits generating at least a portion of said second data from said first data and also authenticating said first and third data as collectively representing a verified valid debit of a highway toll from a smart card containing encrypted data representing monetary value.

16. A roadside collection station as in claim 14 wherein said second data includes at least some of said first data in encrypted form.

17. A roadside collection station as in claim 14 wherein said second data includes roadside collection station transaction sequence and roadside collection station lane number data.

18. A roadside collection station as in claim 14 wherein said second and/or third data includes plural frames of data, each frame including the same roadside collection station transaction sequence and roadside collection station lane number data.

19. A roadside collection station as in claim 17 or 18 including data processing circuits for handling and processing data from and to a plurality of in-vehicle units during the same time internal using said roadside collection station transaction sequence and roadside collection station lane number data to correctly associate together each in-vehicle unit toll collection transaction.

20. A roadside collection station as in claim 14 including a connection to a network of other roadside collection station units associated with nearby highway lanes over which network cross-lane read-in of said third data is passed to the network.

21. A roadside collection station as in claim 14 including a downlink control circuit which prevents operation in said second mode unless authorized by an external downlink controller connected thereto.

22. A roadside collection station as in claim 21 in combination with plural roadside collection stations connected to said external downlink controller which prevents simultaneous downlink communications from roadside collection stations associated with adjacent highway lanes.

23. An automatic highway toll collection system comprising:
- a roadside collection station disposed in proximity to at least one respectively corresponding highway lane and having a bi-directional electromagnetic data communication link coupled to a predetermined toll collection zone disposed in proximity to said at least, one respectively corresponding highway lane;
- an in-vehicle unit disposed in each of plural vehicles passing along the highway and having a bi-directional electromagnetic data communication link coupled to a predetermined vehicular communication zone that moves with the vehicle and intersects said toll collection zone of the roadside collection station for a limited time period as the vehicle passes along said at least one highway lane;
- said in-vehicle units each including a smart card containing encrypted data representing pre-stored increments of money; and
- each said roadside collection station and in-vehicle unit including respective data processing circuits connected to its electromagnetic data communication link for effecting at least the following real-time communication and data processing operations during said limited time period:
  - (a) passing first data from an in-vehicle unit to a roadside collection station to initiate payment of a toll;
  - (b) calculating toll data at the roadside collection station which is based on said first data and passing from the roadside collection station to the in-vehicle unit second data, including said toll data and unique linkage data linking said second data to said first data; and
  - (c) debiting the toll from the smart card at the in-vehicle unit and thereafter passing third data from the in-vehicle unit to the roadside collection station including verification data verifying said debiting and unique linkage data linking said third data to said first and second data.

24. An automatic highway toll collection system as in claim 23 wherein said data representing pre-stored increments of electronic money transferred to the roadside collection station are encrypted and yet anonymous by failing to include any data capable of revealing person or vehicle identity to the roadside collection station.

25. An automatic highway toll collection system as in claim 23 wherein said data representing pre-stored increments of electronic money are communicated from the in-vehicle unit to the roadside collection station in a encrypted form that includes data required for its decryption.

26. An automatic highway toll collection system as in claim 23 wherein said first data originating at the in-vehicle unit includes unique transaction identification data.

27. An automatic highway toll collection system as in claim 26 wherein said unique transaction identification data includes a portion of toll payment data, the rest of which is transmitted as part of said third data.

28. An automatic highway toll collection system as in claims 26 or 27 wherein
- said unique linkage data, comprising part of the second data, includes a portion of said transaction identification data in encrypted form; and
- said in-vehicle unit includes means for locally creating a similar encryption of part of the transaction identification data and for comparing that to the relevant portion of received second data to verify the authenticity of the roadside collection station.

29. An automatic highway toll collection system as in claim 23 wherein said unique linkage data, comprising a portion of the second data and a portion of the third data, includes roadside collection station transaction sequence and roadside collection station lane number data.

30. An automatic highway toll collection system as in claim 29 wherein at least one of said second and third data includes plural frames of data, each frame including said roadside collection station transaction sequence and roadside collection station lane number data.

31. An automatic highway toll collection system as in claim 23 wherein the roadside collection station includes means for communicating with and processing data form and to a plurality of in-vehicle units during a single said limited time period using said unique linkage data to associate together the data related to each in-vehicle unit toll collection transaction.

32. An automatic highway toll collection system as in claim 23 having a plurality of said roadside collection stations, each roadside collection station being disposed in proximity to a respectively associated highway lane at a toll plaza and interconnected to a supervisory plaza computer network to which each roadside collection station forwards received third data not linked to its respectively associated highway lane, said plaza network including means for thereafter verifying the combined parts of a payment.

33. An automatic highway toll collection system as in claim 23 having a plurality of said roadside collection stations, each roadside collection station being disposed in proximity to a respectively associated highway lane and interconnected to a downlink timing controller which allows a given roadside collection station to transmit data to an in-vehicle unit only during downlink time periods authorized by the controller.

34. An automatic highway toll collection system as in claim 33 wherein the downlink timing controller includes means for preventing simultaneous downlink communications from roadside collection stations associated with adjacent highway lanes.

35. An automatic highway toll collection system as in claim 23 wherein each smart card is removably associated with its in-vehicle unit and provides both (a) standard-speed smart card functions at a first rate when connected to standard smart card interface and (b) high-speed smart card functions at a second rate higher than said first rate when connected to an in-vehicle unit.

36. An automatic highway toll collection system as in claim 23 wherein at least some said in-vehicle units include means for optionally operating in a post-payment mode when at least one of said first and third data includes billing identity data for subsequent billing of the toll.

37. An automatic highway toll collection system as in claim 23 or 36 wherein the data processing circuits of each said roadside collection station and in-vehicle unit include means capable of processing both closed highway tolls and open highway tolls.

38. An automatic highway toll collection system as in claim 23 wherein all real-time data processing is performed in the roadside collection station and in-vehicle unit.

39. An automatic highway toll collection system as in claim 23 wherein, during said limited time period;

said roadside collection station initially transmits CW electromagnetic fields into said collection zone awaiting the receipt of said first data from an in-vehicle unit via modulated reflections of said fields; and said in-vehicle units begin continuously modulating said reflected fields upon detecting entry into said collection zone by detecting the presence of said CW fields thereby continuously transmitting said first data.

40. An in-vehicle unit for use in an automatic highway toll collection system, said in-vehicle unit comprising:

data communication circuits for transmitting first data to a roadside collection station while passing thereby;

crytographic data processing circuits for encrypting at least a portion of said first data with a cryptosystem key also present in an authentic roadside collection station;

data communication circuits for receiving second data from a roadside collection station;

authentication means for comparing at least a portion of said second data with an encrypted portion of said first data to the communicating roadside collection station; and toll charging means for paying a highway toll as requested by said roadside collection station only if its authenticity has been successfully ascertained.

41. An in-vehicle unit for use in an automatic highway toll collection system having toll account memory means and toll data processor means, said in-vehicle unit having toll account memory means and toll data processor means comprising:

data communications circuits for sending first data to a roadside collection station while passing thereby; thereafter receiving second data from said roadside collection station; and still later sending third data to the roadside collection station;

said third data including plural packets of data; and said data communications circuits including means for including in each said packet of data predetermined linkage data uniquely linked to said first and second data.

42. An in-vehicle unit for use in an automatic highway toll collection system, said in-vehicle unit comprising:

data communications circuits for transceiving data with a roadside collection station while passing thereby;

a data store of encrypted data representing monetary funds; and means for sending a portion of the data representing said monetary funds in an initial data communication with a roadside collection station to also serve as a unique toll collection transaction identity code.

43. An in-vehicle unit for use in an automatic highway toll collection system having toll account memory means and toll data processor means, said in-vehicle unit comprising:

data communications circuits for sending first data to a roadside collection station while passing thereby; thereafter receiving second data from said roadside collection station; and still later sending third data to the roadside collection station; and means for automatically initiating operation of said data communications circuits in a first mode upon detecting an in-vehicle unit passing in proximity to a roadside collection station.

44. A roadside collection station for use in an automatic highway toll collection system having toll account memory means and toll data processor means, said roadside collection station comprising:

data communications circuits adapted for receiving first data from an in-vehicle unit moving therepast; thereafter transmitting second data to said in-vehicle unit; and still later receiving third data from said in-vehicle unit; and means for encrypting at least a portion of said first data and for including at least some of the result as part of said second data to authenticate the roadside collection station to the in-vehicle unit.

45. A roadside collection station for use in an automatic highway toll collection system having toll account memory means and toll data processor means, said roadside collection station comprising:

data communications circuits for receiving first data from an in-vehicle unit moving therepast; thereafter transmitting second data to said in-vehicle unit; and still later receiving third data from said in-vehicle unit; and means for including in said second data unique linkage data to said first data and for detecting and using similar unique linkage data in said third data to associate same with the correct in-vehicle unit and first data even in the presence of multiple communicating in-vehicle units within a closely spaced time duration.

46. A roadside collection station for use in an automatic highway toll collection system having toll account memory means and toll data processor means, said road collection station comprising:

data communications circuits for transceiving data with in-vehicle units moving therepast in a multi-lane highway environment; and said data communications circuits including control means for causing data transmit and receive operations with an in-vehicle unit to occur only when permitted by an external communication timing controller.

\* \* \* \* \*